United States Patent
Iwasaki et al.

(10) Patent No.: US 7,769,617 B2
(45) Date of Patent: Aug. 3, 2010

(54) WORKER MANAGEMENT SYSTEM, WORKER MANAGEMENT APPARATUS AND WORKER MANAGEMENT METHOD

(75) Inventors: Kenya Iwasaki, Tokyo (JP); Hiroshi Nishikawa, Tokyo (JP)

(73) Assignee: Tokyo Electron Limited, Tokyo (JP)

( * ) Notice: Subject to any disclaimer, the term of this patent is extended or adjusted under 35 U.S.C. 154(b) by 976 days.

(21) Appl. No.: 11/117,676

(22) Filed: Apr. 29, 2005

(65) Prior Publication Data

US 2005/0209902 A1 Sep. 22, 2005

Related U.S. Application Data

(63) Continuation of application No. PCT/JP03/13841, filed on Oct. 29, 2003.

(30) Foreign Application Priority Data

Oct. 29, 2002 (JP) ............................. 2002-314866

(51) Int. Cl.
G05B 19/418 (2006.01)
G06F 9/46 (2006.01)
(52) U.S. Cl. ............... 705/8; 705/7; 705/9; 340/573.4; 340/636.1; 340/521; 340/531; 340/539.26; 707/102
(58) Field of Classification Search ............... 705/8
See application file for complete search history.

(56) References Cited

U.S. PATENT DOCUMENTS

| | | | | |
|---|---|---|---|---|
| 4,665,385 A | * | 5/1987 | Henderson | 340/539.26 |
| 4,668,939 A | * | 5/1987 | Kimura et al. | 340/521 |
| 4,952,928 A | * | 8/1990 | Carroll et al. | 340/10.41 |
| 5,257,007 A | * | 10/1993 | Steil et al. | 340/539.3 |
| 5,867,097 A | * | 2/1999 | Jung et al. | 340/531 |
| 5,878,369 A | * | 3/1999 | Rudow et al. | 701/215 |
| 5,905,438 A | * | 5/1999 | Weiss et al. | 340/636.1 |
| 6,445,968 B1 | * | 9/2002 | Jalla | 700/101 |
| 6,647,328 B2 | * | 11/2003 | Walker | 701/36 |
| 6,938,048 B1 | * | 8/2005 | Jilk et al. | 707/102 |
| 2007/0219842 A1 | * | 9/2007 | Bansal et al. | 705/9 |

FOREIGN PATENT DOCUMENTS

| | | |
|---|---|---|
| JP | 05-123947 | 5/1993 |
| JP | 08-107096 | 4/1996 |
| JP | 11-345250 | 12/1999 |
| JP | 2000-331069 | 11/2000 |

\* cited by examiner

*Primary Examiner*—Romain Jeanty
*Assistant Examiner*—Jaime Cardenas-Navia
(74) *Attorney, Agent, or Firm*—DLA Piper LLP (US)

(57) ABSTRACT

A worker management system, which includes a plant 100 divided into a plurality of work areas each in correspondence to specific task contents, a database 220 having stored therein task identification information correlating each work area 112 with contents of tasks performed therein and worker detection sensors 130 installed in each work area, identifies the specific work area where a worker is currently located based upon outputs from the worker detection means and then identifies the task currently performed by the worker based upon the task identification information. Based upon the current task thus identified, a decision is made as to whether the worker should continue the current task or be assigned a new task and an instruction for task execution is issued to the worker. Therefore the identification of current tasks, the assignment of a new task and the task reassignment are facilitated to improve the work efficiency.

4 Claims, 18 Drawing Sheets

FIG.5

| AREA INFORMATION | | DEVICE INFORMATION | TASK CONTENTS |
|---|---|---|---|
| CLEAN ROOM AREA | EQUIPMENT ROOM AREA | WARNING, TROUBLESHOOTING ACCESS | TROUBLESHOOTING TASKS |
| | | WARNING, ROUTINE TASK ACCESS | ROUTINE TASKS (e.g., WET CLEANING) |
| | NON-EQUIPMENT ROOM AREA | OPERATION ACCESS | REGULAR OPERATION TASKS |
| | | ROUTINE TASK ACCESS | ROUTINE TASKS (e.g., DRY CLEANING) |
| | | NO ACCESS | OTHER NON-EQUIPMENT ROOM TASKS |
| NON-CLEAN ROOM AREA | CENTRAL MONITOR ROOM AREA | — | MONITORING OF OVERALL PRODUCTION, etc. |
| | UTILITY ROOM AREA | WARNING, TROUBLESHOOTING ACCESS | TROUBLESHOOTING TASKS RELATED TO AIR CLEANERS, etc. |
| | | WARNING, ROUTINE TASK ACCESS | ROUTINE TASKS RELATED TO AIR CLEANERS, etc. |
| | WAREHOUSING AREA | — | PARTS MANAGEMENT TASKS, etc. |
| | OFFICE AREA | — | ORDERING PARTS, etc. |
| | STAFF LOUNGE AREA | — | NO TASKS |
| OUTSIDE PLANT AREA | — | — | SUPERVISING DELIVERIES OF CHEMICALS INTO TANKS, etc. |

FIG.6

| PRIORITY LEVEL | TASK CATEGORY |
|---|---|
| 1 | EMERGENCY TASKS |
| 2 | TROUBLESHOOTING TASKS |
| 3 | REGULAR OPERATION TASKS |
| 4 | ROUTINE TASKS |
| 5 | OTHER TASKS |

FIG.7

| TASKS | | WORKER CATEGORY |
|---|---|---|
| TASK CATEGORY ~242 | TASK CONTENTS ~246 | ~244 (248, 240) |
| EMERGENCY TASKS | FIREFIGHTING IN THE EVENT OF FIRE, etc. | ALL WORKERS |
| TROUBLESHOOTING TASKS | ELECTRICAL SYSTEM TROUBLESHOOTING TASKS | ELECTRICAL ENGINEER |
| | MECHANICAL SYSTEM TROUBLESHOOTING TASKS | MECHANICAL ENGINEER |
| | PROCESS SYSTEM TROUBLESHOOTING TASKS | PROCESS ENGINEER |
| REGULAR OPERATION TASKS | DATA ENTRY TASKS RELATED TO PRODUCTION, etc. | OPERATOR |
| ROUTINE TASKS | ROUTINE MAINTENANCE TASKS, etc. | ROUTINE TASK WORKER |
| OTHER TASKS | PROCESS MANAGEMENT TASKS, etc. | OTHER WORKER |

FIG.8

| | | | 1 | 2 | 3 | 4 | 5 |
|---|---|---|---|---|---|---|---|
| 251 | FILING NUMBER | | | | | | |
| 252 | NAME | | □YAMA □○ | □MOTO □YUKI | □KI□AKI | □KAWA □KO | □MURA □○ |
| 253 | ID | | ***** | ***** | ***** | ***** | ***** |
| 254 | PASSWORD | | ***** | ***** | ***** | ***** | ***** |
| 255 | AFFILIATION | | □□PLANT | □□PLANT | □□ COMPANY | □□ COMPANY | □□ COMPANY |
| 256 | WORKER CATEGORY | | ELECTRICAL ENGINEER | MECHANICAL ENGINEER | PROCESS ENGINEER | OPERATOR | ROUTINE TASK WORKER |
| 257 | TASK CATEGORY | TASKS / TASK CONTENTS | | | | | |
| | EMERGENCY TASKS | FIREFIGHTING IN THE EVENT OF FIRE, etc. | ○ | ○ | ○ | ○ | ○ |
| | TROUBLESHOOTING TASKS | ELECTRICAL SYSTEM TROUBLESHOOTING TASKS | ○ | △ | × | × | × |
| | | MECHANICAL SYSTEM TROUBLESHOOTING TASKS | △ | ○ | × | × | × |
| | | PROCESS SYSTEM TROUBLESHOOTING TASKS | × | × | ○ | × | × |
| | REGULAR OPERATION TASKS | DATA ENTRY TASKS RELATED TO PRODUCTION, etc. | ○ | ○ | ○ | ○ | △ |
| | ROUTINE TASKS | ROUTINE MAINTENANCE TASKS, etc. | ○ | ○ | ○ | △ | ○ |
| | OTHER TASKS | PROCESS MANAGEMENT TASKS, etc. | △ | △ | △ | △ | △ |

| ERROR CODE | ERROR MESSAGE | ERROR ORIGINATING AREA | WORKER CATEGORY |
|---|---|---|---|
| AABB01 | REFLECTED HIGH FREQUENCY WAVE EXCEEDING UPPER LIMIT VALUE | HIGH FREQUENCY GENERATOR OR THE LIKE | ELECTRICAL ENGINEER |
| AABB02 | TIMEOUT WHILE AWAITING HIGH-FREQUENCY POWER STABILIZATION | HIGH FREQUENCY GENERATOR OR THE LIKE | ELECTRICAL ENGINEER |
| CCDD01 | LOWERED COOLING WATER FLOW RATE AT PUMP | PUMP UNIT OR THE LIKE | MECHANICAL ENGINEER |
| CCDD02 | PUMP IN ABNORMAL STATE | PUMP UNIT OR THE LIKE | MECHANICAL ENGINEER |
| EEFF01 | ERROR IN TRANSFER ARM ACTIVATION | TRANSFER UNIT OR THE LIKE | MECHANICAL ENGINEER |
| EEFF02 | TRANSFER ARM MOTOR EMERGENCY STOP | TRANSFER UNIT OR THE LIKE | MECHANICAL ENGINEER |

| INSPECTION RESULTS | WORKER CATEGORY |
|---|---|
| BURN RESIST | PROCESS ENGINEER |
| ABNORMAL ETCHING RATE | PROCESS ENGINEER |
| ABNORMAL SELECTION RATIO | PROCESS ENGINEER |

FIG.19

DAILY TASK REPORT

○ MONTH ○ DAY

WORKER: NAME ☐YAMA☐O

| TIME | WORK AREA | TASK CONTENTS |
|------|-----------|---------------|
| 8:00 | NON-EQUIPMENT ROOM AREA IN CLEAN ROOM | REGULAR OPERATION TASK AT DEVICE 2 |
| 9:00 | 〃 | 〃 |
| 10:00 | EQUIPMENT ROOM AREA IN CLEAN ROOM | ELECTRICAL SYSTEM TROUBLESHOOTING TASK AT DEVICE 3 |
| 11:00 | 〃 | 〃 |
| 12:00 | STAFF LOUNGE AREA | NO TASK |
| ⋮ | | |

WORKER MANAGEMENT SYSTEM, WORKER MANAGEMENT APPARATUS AND WORKER MANAGEMENT METHOD

CROSS REFERENCE TO RELATED APPLICATIONS

This is a continuation application of PCT International Application No. PCT/JP03/13841 filed on Oct. 29, 2003, which claimed priority of Japanese Patent Application No. JP2002-314866 filed on Oct. 29, 2002. The contents of these applications are incorporated herein by reference in their entirety.

BACKGROUND OF THE INVENTION

1. Field of the Invention

The present invention relates to a worker management system, a worker management apparatus and a worker management method.

2. Description of the Related Art

At a work site such as a semiconductor manufacturing plant, various types of tasks are performed in different areas that include an equipment room where semiconductor manufacturing devices and the like are installed in a clean room. For instance, while an input operation for the semiconductor device production needs to be performed outside the equipment room and a troubleshooting operation for correcting an error in a semiconductor manufacturing device needs to be performed in the equipment room within the clean room, operations such as a parts management operation for managing parts in the warehouse need to be performed outside the clean room. Thus, workers with different skills are often needed at such a work site since the required skills for the individual operations are different.

The management of workers having varying skills is a challenging undertaking, and unless work is assigned efficiently, individual workers will not be able to achieve maximum work efficiency. Accordingly, it is desirable to increase the work efficiency of the individual workers by striking an optimal match for workers and specific types of work. While it is ideal to select and give instructions to an optimal worker to perform a given operation with the right timing, this is not easily accomplished in practice.

For instance, if a new task that must be performed arises while a worker is engaged in a different operation, the worker cannot be instructed to take on the new task. In this situation, unless the details of the operation the worker is currently performing are ascertained, a decision as to whether or not to instruct him to interrupt the current operation to take on the new task cannot be made. The new task may instead be performed by an alternative worker. However, a worker with the skills needed to perform the new task may not always be available. For these reasons, it is essential to ascertain the specific details of the task the worker is currently performing.

Since many different types of work are performed at a semiconductor manufacturing plant and the like as described above, it is extremely difficult to keep abreast of the specific tasks the individual workers are currently performing. A system disclosed in Japanese Laid Open Patent Publication No. H8-107096 enables identification of the specific operations being performed by workers to a certain degree by pre-assigning a password that allows personnel to make entries in an operation panel screen in correspondence to each type of work so as to ascertain types of work in which individual workers are currently performing reference to passwords. An operator is only allowed to make entries in operator screens, whereas an engineer is allowed to make entries in engineer screens by first entering a specific password.

However, this technology only makes it possible to identify different types of workers (classified worker categories) such as operators and engineers and the exact task a given worker is currently performing cannot be detected through the technology. This shortcoming may be remedied by pre-assigning an ID to each worker and requiring the worker to first enter his worker ID to operate the screen at the operation panel so as to enable a detection of the exact type of work the worker assigned with the ID is currently engaged in. However, a problem arises in the worker ID entry system in that types of work that do not require screen input operations or the like cannot be identified.

Alternatively, specific types of tasks the individual workers perform may be identified by mandating each worker to enter task contents for each task he takes in an operation panel screen or the like for the record. However, workers may be significantly slowed down if they have to enter task contents each time they take on a new task, which may result in lowered work efficiency. In particular, in an emergency such as a fire or a machine failure, workers need to perform troubleshooting as soon as possible and for this reason, mandating the task contents entry for purposes of worker management is not appropriate.

There are numerous work areas including areas within and outside the clean room and areas within and outside the equipment room at a semiconductor manufacturing plant or the like, and it is thought that a reasonably accurate identification of specific task categories can be made in correspondence to the work areas where they are performed. Based upon this concept, the applicant of the present application concluded that the specific type of operation being performed by a specific worker can be identified by ascertaining the location of the worker. The present invention has been completed by taking advantage of the characteristics of specific application fields such as semiconductor manufacturing plants where a reasonably accurate identification of the categories of tasks being performed can be made in correspondence to specific work areas.

Accordingly, an object of the present invention, which has been completed by addressing the problems discussed above, is to provide a worker management system, a worker management apparatus and a worker management method that facilitate identification of specific types of work currently performed by workers, assignment of a new task and task reassignment and the like, make it possible to assign optimally suited workers to specific tasks and improve the work efficiency of the individual workers.

SUMMARY OF THE INVENTION

In order to achieve the object described above, a worker management apparatus achieved in an aspect of the present invention to be used to manage workers performing tasks at a work site divided into a plurality of work areas each in correspondence to specific task contents, comprising;

a task identification information storage part for storing in memory task identification information correlating each of the work areas in the work site with task contents of tasks performed in the work area;

a worker position identification part for identifying a specific work area where a worker is currently present based upon outputs from worker detection part installed in each of the work areas;

a current task identification part for identifying the task currently performed by the worker in correspondence to the work area where the worker is located which is identified by the worker position identification part based upon the task identification information stored at the task identification information storage part;

a decision-making part for making a decision as to whether the worker should continue performing the current task or should be assigned with a new task based upon the current task identified by the current task identification part and an electromagnetic wave transmitted from a portable information terminal carried by the worker; and an instruction part for issuing an instruction for task execution to the worker based upon the results of the decision made by the decision-making part, wherein:

a sensor is installed at the portable information terminal for abnormal state detection, and the decision-making part makes a decision as to whether the worker should continue performing the current task or should be assigned a new task based upon a detection value provided by the sensor.

The present invention also provides a worker management apparatus achieved in an aspect of the present invention to be used to manage workers performing tasks at a work site divided into a plurality of work areas each in correspondence to specific task contents, comprising;

a task identification information storage part for storing in memory task identification information correlating each of the work areas in the work site with task contents of tasks performed in the work area;

a worker position identification part for identifying a specific work area where a worker is currently present based upon outputs from worker detection part installed in each of the work areas;

a current task identification part for identifying the task currently performed by the worker in correspondence to the work area where the worker is located which is identified by the worker position identification part based upon the task identification information stored at the task identification information storage part;

a worker skill information storage part for storing in memory worker skill information correlating each of the workers with tasks that each of the workers is capable of performing;

a task priority level information storage part for storing in memory task priority information;

a new task detection part for detecting that a new task has arisen based upon an electromagnetic wave transmitted from a portable information terminal carried by the worker;

a worker extraction part for extracting workers capable of performing the new task detected by the new task detection part based upon the worker skill information stored at the worker skill information storage part;

a worker identification part for executing worker identification processing by engaging the current task identification part to identify current tasks being performed by the workers extracted by the worker extraction part, obtaining and comparing priority levels of the current tasks and a priority level of the new task based upon the task priority level information stored at the task priority level information storage part, and identifying a worker performing a current task with a priority level lower than the priority level of the new task as a worker to take on the new task; and an instruction part for issuing an instruction for work execution to the worker identified by the worker identification part, wherein:

a sensor is installed at the portable information terminal for abnormal state detection, and the new task detection part detects that the new task has arisen based upon a detection value provided by the sensor.

The object described above is also achieved in a worker management apparatus realized in another aspect of the present invention that manages workers performing tasks in a work site divided into a plurality of work areas each in correspondence to specific task contents, comprising;

a task identification information storage part for storing in memory task identification information correlating each of the work areas in the work site with task contents of tasks performed in the work area;

a worker position identification part for identifying a specific work area where a worker is currently present based upon outputs from worker detection part installed in each of the work areas;

a current task identification part for identifying the task currently performed by the worker in correspondence to the work area where the worker is located which is identified by the worker position identification part, based upon the task identification information stored at the task identification information storage part;

a task priority level information storage part for storing in memory task priority information;

a new task detection part for detecting that a new task has arisen based upon an electromagnetic wave transmitted from a portable information terminal carried by the worker;

a task reassignment part for engaging the current task identification part to identify current tasks being performed by all the workers when the new task is detected by the new task detection part, assigning task priority levels to all tasks including the current tasks and the new task based upon the task priority level information stored at the task priority level information storage part, and reassigning all the tasks for all the workers starting with a task with a higher priority level; and an instruction part for issuing instructions for all the workers to perform tasks reassigned by the task reassignment part, wherein:

a sensor is installed at the portable information terminal for abnormal state detection, and the new task detection part detects that the new task has arisen based upon a detection value provided by the sensor.

The task reassignment part in the worker management apparatus described above may designate a task with the highest task priority level as a new task and the worker management apparatus may further include a worker skill information storage part for storing in memory worker skill information correlating each of the workers with tasks that each of the workers is capable of performing;

a worker extraction part for extracting workers capable of performing the new task based upon the worker skill information stored at the worker skill information storage part; and a worker identification part for executing worker identification processing by engaging the current task identification part to identify current tasks being performed by the workers extracted by the worker extraction part, ascertaining and comparing priority levels of the current tasks and a priority level of the new task based upon the task priority level information stored at the task priority level information storage part and identifying a worker performing a current task with a priority level lower than the priority level of the new task as a worker to take on the new task.

In addition, the worker detection part may each include a receiver that receives electromagnetic waves transmitted from transmitters carried by each of the workers, the transmitters may each be set so as to transmit an electromagnetic wave with a frequency unique to a specific worker, and the worker position identification part may determine the worker detection part having received an electromagnetic wave with the frequency assigned to a worker undergoing a work area detection and identify the work area in which the worker detection part is installed as the work area where the worker is present.

Alternatively, the worker detection part may each include a receiver that receives electromagnetic waves transmitted from transmitters carried by each of the workers, the transmitters may each be set so as to transmit an electromagnetic wave carrying identification information that can be used to identify a specific worker, and the worker position identification part may obtain worker identification information from the worker detection part, determine the worker detection part having received the worker identification information corresponding to a worker undergoing a work area detection and identify the work area in which the worker detection part is installed as the work area where the worker is present.

Furthermore, the worker management apparatus may include a task information acquisition part for obtaining task information of the workers from work devices installed in the work areas, and the current task identification part may obtain task information originating at a work device at which the worker is performing a task via the task information acquisition part in addition to the work area information indicating the work area identified as the work area in which the worker is currently present and identify the current task being performed by the worker based upon the area information and the task information.

In yet another aspect of the present invention, the object described earlier is achieved through a worker management method for managing workers who perform tasks in a work site divided into a plurality of work areas each in correspondence to specific task contents, comprising;

a worker position identification step in which a specific work area where a worker is currently present is identified based upon outputs from worker detection part installed in each of the work areas;

a current task identification step in which the task currently performed by the worker present in the work area identified through the worker position identification step is identified based upon task identification information available at a task identification information storage part for storing in memory the task identification information correlating each of the work areas at the work site with task contents of the tasks performed in the work areas;

a decision-making step in which a decision is made as to whether the worker should continue performing the current task or should be assigned a new task based upon the current task identified through the current task identification step and an electromagnetic wave transmitted from a portable information terminal carried by the worker; and an instruction step in which an instruction for task execution is issued to the worker based upon the results of the decision made in the decision-making step, wherein:

a sensor for abnormal state detection is installed at the portable information terminal, and in the decision-making step, a decision is made as to whether the worker should continue performing the current task or should be assigned the new task based upon a detection value provided by the sensor.

In yet another aspect of the present invention, the object described earlier is achieved through a worker management method for managing workers who perform tasks in a work site divided into a plurality of work areas each in correspondence to specific task contents, comprising;

a worker position identification step in which a specific work area where a worker is currently present is identified based upon outputs from worker detection part installed in each of the work areas;

a current task identification step in which the task currently performed by the worker present in the work area identified through the worker position identification step is identified based upon task identification information available at a task identification information storage part for storing in memory the task identification information correlating each of the work areas at the work site with task contents of the tasks performed in the work areas;

a new task detection step in which a new task having arisen is detected based upon an electromagnetic wave transmitted from a portable information terminal carried by the worker;

a worker extraction step in which workers capable of performing the new task detected in the new task detection step are extracted based upon worker skill information available at a worker skill information storage part for storing in memory the worker skill information correlating each of the workers with tasks that each of the workers is capable of performing;

a worker identification step in which worker identification processing is executed by identifying through the current task identification step current tasks performed by the workers extracted in the worker extraction step, obtaining and comparing priority levels of the current tasks and a priority level of the new task based upon task priority level information available at a task priority level information storage part for storing in memory the task priority level information, and identifying a worker performing a current task with a priority level lower than the priority level of the new task as a worker to take on the new task; and an instruction step in which an instruction to perform the new task is issued to the worker identified in the worker identification step, wherein:

a sensor for abnormal state detection is installed at the portable information terminal; and in the new task detection step, the new task having arisen is detected based upon a detection value provided by the sensor.

In yet another aspect of the present invention, the object described earlier is achieved through a worker management method for managing workers who perform tasks in a work site divided into a plurality of work areas each in correspondence to specific task contents, comprising;

a worker position identification step in which a specific work area where a worker is currently present is identified based upon outputs from worker detection part installed in each of the work areas;

a current task identification step in which the task currently performed by the worker present in the work area identified through the worker position identification step is identified based upon task identification information available at a task identification information storage part for storing in memory the task identification information correlating each of the work areas at the work site with task contents of the tasks performed in the work areas;

a new task detection step in which a new task having arisen is detected based upon an electromagnetic wave transmitted from a portable information terminal carried by each worker;

a task reassignment step in which current tasks being performed by all the workers is identified through the current task identification step when a new task is detected in the new task detection step, task priority levels are assigned to all the tasks including the current tasks and the new task based upon task priority level information available at a task priority level information storage part for storing in memory the task priority information, and all the tasks are reassigned for all the workers starting with a task with a higher priority level; and an instruction step in which instructions are issued to all the workers to perform tasks reassigned through the task reassignment step, wherein:

a sensor for abnormal state detection is installed at the portable information terminal; and in the new task detection step, the new task having arisen is detected based upon a detection value provided by the sensor.

In addition, in another aspect of the present invention, the object described above is achieved through a worker management system comprising;

a work site divided into a plurality of work areas each corresponding to specific task contents;

a task identification information storage part for storing in memory task identification information correlating each of the work areas in the work site with task contents of tasks performed in the work area;

worker detection part installed in each of the work areas;

a worker position identification part for identifying a specific work area where a worker is currently present based upon outputs from worker detection part installed in each work area;

a current task identification part for identifying the task currently performed by the worker in correspondence to the work area where the worker is located which is identified by the worker position identification part based upon the task identification information stored at the task identification information storage part;

a decision-making part for making a decision as to whether or not the worker should continue performing the current task or should be assigned with a new task based upon the current task identified by the current task identification part; and an instruction part for issuing an instruction for task execution to the worker based upon the results of the decision made by the decision-making part.

by adopting the worker management system according to the present invention described above, the area (location) at which a given worker is currently present is detected, and in reference to the tasks correlated with the area, the task that the worker is currently performing can be ascertained with ease. As a result, if, for instance, a new task arises, the new task can be assigned or all the tasks can be reassigned with ease, which makes it possible to assign the optimal worker to each task and improve the work efficiency of the individual workers.

In yet another aspect of the present invention, the object described above is achieved through a worker management system comprising;

a work site divided into a plurality of work areas each corresponding to specific task contents;

a task identification information storage part for storing in memory task identification information correlating each of the work areas in the work site with task contents of tasks performed in the work area;

a worker detection part each installed in one of the work areas;

a worker position identification part for identifying a specific work area where a worker is currently present based upon outputs from the worker detection part;

a current task identification part for identifying the task currently performed by the worker in correspondence to the work area where the worker is located which is identified by the worker position identification part based upon the task identification information stored at the task identification information storage part;

a worker skill information storage part for storing in memory worker skill information correlating each of the workers with tasks that the worker is capable of performing;

a task priority level information storage part for storing in memory task priority information;

a new task detection part for detecting that a new task has arisen;

a worker extraction part for extracting workers capable of performing the new task detected by the new task detection part based upon the worker skill information stored at the worker skill information storage part;

a worker identification part for executing worker identification processing by engaging the current task identification part to identify current tasks being performed by the workers extracted by the worker extraction part, ascertaining and comparing priority levels of the current tasks and a priority level of the new task based upon the task priority level information stored at the task priority level information storage part and identifying a worker performing a current task with a priority level lower than the priority level of the new task as a worker to take on the new task; and an instruction part for issuing an instruction for the worker identified by the worker identification part to perform the new task.

In the worker management system according to the present invention described above, the priority levels of the current tasks having been detected are compared with the priority level of the new task and an instruction is issued to a worker performing a task with a priority level lower than the priority level of the new task to take on the new task. Since a decision is made as to whether or not a given worker should be assigned a new task having arisen based upon the priority levels of the new task and the current task, a task with a higher priority level, i.e., a more important task, can be undertaken more promptly. As a result, by placing individual workers on tasks where they are most needed, optimal task assignment is achieved.

The worker skill information storage part in the worker management system described above may store in memory information indicating a classified worker category in correspondence to each worker, and the worker management system may further include a task skill information storage part for storing in memory task skill information correlating each task with a classified category of workers with skills required to perform the task and a priority rank assignment part for assigning priority ranks to the extracted workers by ascertaining classified categories of workers available at the worker skill information storage part in correspondence to the workers extracted by the worker extraction part, ascertaining the worker category corresponding to the new task based upon the task skill information available at the task skill information storage part and assigning a higher rank to a worker in a worker category matching the classified worker category corresponding to the new task. The worker identification part in this worker management system may execute the worker identification processing starting with the worker with the highest worker priority rank assigned by the priority rank assignment part among the workers extracted by the worker extraction part.

In the system, priority ranks are assigned to the workers extracted as those capable of performing the new task by assigning a highest priority rank to a worker in the worker category (e.g., an engineer, an operator, a routine task worker or the like) best suited for the new task and the workers are each checked starting with the worker with the highest priority rank by comparing the priority levels of the current task and the new task when determining the worker to undertake the new task. The worker best suited to perform the new task can be selected more quickly and the individual workers can be assigned to tasks in which they are most needed in this system.

In yet another aspect of the present invention, the object described above is achieved through a worker management system comprising;

a work site divided into a plurality of work areas each corresponding to specific task contents;

a task identification information storage part for storing in memory task identification information correlating each of the work areas in the work site with task contents of tasks performed in the work area;

a worker detection part each installed in one of the work areas;

a worker position identification part for identifying a specific work area where a worker is currently present based upon outputs from the worker detection part;

a current task identification part for identifying the task currently performed by the worker in correspondence to the work area where the worker is located which is identified by the worker position identification part based upon the task identification information stored at the task identification information storage part;

a task priority level information storage part for storing in memory task priority information;

a new task detection part for detecting that a new task has arisen;

a task reassignment part for reassigning all tasks for the entire personnel starting with a task with a highest priority level when a new task is detected by the new task detection part by engaging the current task identification part to identify the tasks all the workers are currently performing and assigning task priority levels to all the tasks including the current tasks and the new task based upon the task priority level information stored at the task priority level information storage part; and an instruction part for issuing instructions for all the workers to perform the tasks assigned by the task reassignment part.

In the worker management system according to the present invention described above, when a new task has arisen, the tasks all the workers are currently performing are detected and all the tasks including the current tasks and the new task are reassigned. As a result, better suited workers can be assigned to all the tasks including the new task. Thus, since the individual workers are assigned to tasks for which they are most needed, a more efficient task assignment and more efficient work execution are achieved.

The task reassignment part in the worker management system described above may designate a task with a highest task priority level as a new task and the worker management system may further include a worker skill information storage part for storing in memory worker skill information correlating each of the workers with tasks that the worker is capable of performing, a worker extraction part for extracting workers capable of performing the new task based upon the worker skill information stored at the worker skill information storage part, a worker identification part for executing worker identification by engaging the current task identification part to identify current tasks being performed by the workers extracted by the worker extraction part, ascertaining and comparing priority levels of the current tasks and a priority level of the new task based upon the task priority level information stored at the task priority level information storage part and identifying a worker performing a current task with a priority level lower than the priority level of the new task as a worker to take on the new task.

In the system described above, when reassigning all the tasks including the new task, workers are assigned first to tasks with higher priority levels, and thus, more important tasks can be undertaken by appropriate workers faster. In addition, when reassigning all the tasks including the new task, an instruction can be issued to a worker currently engaged in a task with a priority level lower than the priority level of the new task to perform the new task by comparing the priority levels of the current tasks having been detected and the priority level of the new task. Since this ensures that an optimally qualified worker is selected to undertake an important task with a higher priority level, the individual workers are assigned to tasks for which they are most needed to optimize the task assignment and improve the work efficiency.

In yet another aspect of the present invention, the object described above is achieved through a worker management system comprising a work site divided into a plurality of work areas each corresponding to specific task contents;

a task identification information storage part for storing in memory task identification information correlating each of the work areas in the work site with task contents of tasks performed in the work area;

a worker detection part each installed in one of the work areas;

a worker position identification part for identifying a specific work area where a worker is currently present based upon outputs from the worker detection part;

a current task identification part for identifying the task currently performed by the worker in correspondence to the work area where the worker is located which is identified by the worker position identification part based upon the task identification information stored at the task identification information storage part;

a task information storage part for storing in memory, over predetermined intervals, current tasks all the workers are performing which are identified by the current task identification part; and a task report preparation part for preparing a task report including contents of tasks performed by a specific worker based upon the task information stored over the predetermined intervals at the task information storage part.

In the worker management system according to the present invention described above, a task report such as a daily task report, a monthly task report or the like can be prepared with ease. Furthermore, since the tasks performed by each worker are automatically detected to generate task information based upon which a worker report is filed, the worker does not need to make entries at the portable information terminal or the like each time he undertakes a new task and thus, work efficiency is improved. In addition, since an objective task report instead of a subjective report compiled by the worker himself is provided, an accurate task report is available at all times.

The task report preparation part may also store in memory a task unit price to be charged when each task is performed and may prepare a task report that contains task unit prices of tasks and the grand total of the task unit prices. The work site may be a semiconductor manufacturing plant, and in such a case, a worker may be personnel dispatched from a company other than the company that owns the work site, i.e., the semiconductor manufacturing plant. The worker management system adopted in this application makes it possible for the dispatched worker to print out in a task report the task unit prices of the various tasks and the grand total of the unit prices and bill the client company for fees corresponding to tasks having been performed based upon the grand total.

In yet another aspect of the present invention, the object described earlier is achieved in a worker management apparatus to be used to manage workers performing tasks at a work site divided into a plurality of work areas each in correspondence to specific task contents, comprising:

a task identification information storage part for storing in memory task identification information correlating each of the work areas in the work site with task contents of tasks performed in the work area;

a worker position identification part for identifying a specific work area where a worker is currently present based upon outputs from worker detection part installed in each work area;

a current task identification part for identifying the task currently performed by the worker in correspondence to the work area where the worker is located which is identified by the worker position identification part based upon the task identification information stored at the task identification information storage part;

a decision-making part for making a decision as to whether or not the worker should continue performing the current task or should be assigned with a new task based upon the current task identified by the current task identification part; and an instruction part for issuing an instruction for task execution to the worker based upon the results of the decision made by the decision-making part.

By adopting the worker management apparatus according to the present invention described above, the area (location) at which a given worker is currently present is detected, and in reference to tasks correlated with the area, the specific task that the worker is currently performing can be ascertained with ease. As a result, if, for instance, a new task arises, the new task can be assigned or all the tasks can be reassigned with ease, which makes it possible to assign the optimal worker to each task and improve the work efficiency of the individual workers.

In yet another aspect of the present invention, the object described earlier is achieved in a worker management apparatus to be used to manage workers performing tasks at a work site divided into a plurality of work areas, each in correspondence to specific task contents, comprising:

a task identification information storage part for storing in memory task identification information correlating each of the work areas in the work site with task contents of tasks performed in the work area;

a worker position identification part for identifying a specific work area where a worker is currently present based upon outputs from worker detection part installed in each work area;

a current task identification part for identifying the task currently performed by the worker in correspondence to the work area where the worker is located which is identified by the worker position identification part based upon the task identification information stored at the task identification information storage part;

a worker skill information storage part for storing in memory worker skill information correlating each of the workers with tasks that the worker is capable of performing;

a task priority level information storage part for storing in memory task priority information;

a new task detection part for detecting that a new task has arisen;

a worker extraction part for extracting workers capable of performing the new task detected by the new task detection part based upon the worker skill information stored at the worker skill information storage part;

a worker identification part for executing worker identification processing by engaging the current task identification part to identify current tasks the workers extracted by the worker extraction part are performing, ascertaining and comparing priority levels of the current tasks and a priority level of the new task based upon the task priority level information stored at the task priority level information storage part and identifying a worker performing a current task with a priority level lower than the priority level of the new task as a worker to take on the new task; and an instruction part for issuing an instruction for the worker identified by the worker identification part to perform the new task.

In the worker management apparatus according to the present invention described above, the priority levels of the current tasks having been detected are compared with the priority level of the new task and an instruction is issued to a worker performing a task with a priority level lower than the priority level of the new task to take on the new task. Since a decision is made as to whether or not a given worker should be assigned a new task having arisen based upon the priority levels of the new task and the current task, a task with a higher priority level, i.e., a more important task, can be undertaken more promptly. As a result, by placing individual workers on tasks where they are most needed, optimal task assignment is achieved.

The worker skill information storage part in the worker management apparatus described above may store in memory information indicating a classified worker category in correspondence to each worker, and the worker management apparatus may further include a task skill information storage part for storing in memory task skill information correlating each task with a classified category of workers with skills required to perform the task and a priority level assignment part for assigning priority ranks to the extracted workers by ascertaining the classified categories of workers available at the worker skill information storage part in correspondence to the workers extracted by the worker extraction part, ascertaining the specified worker category corresponding to the new task based upon the task skill information available at the task skill information storage part and assigning a higher rank to a worker in a worker category matching the classified worker category corresponding to the new task. The worker identification part in this worker management apparatus may execute the worker identification processing starting with the worker with the highest worker priority rank assigned by the priority rank assignment part among the workers extracted by the worker extraction part. The worker management apparatus is capable of quickly selecting an optimal worker to undertake a new task and issuing instructions for the individual workers to perform the tasks for which they are best suited.

The object described above is also achieved in a worker management apparatus that manages workers performing tasks in a work site divided into a plurality of work areas each in correspondence to specific task contents, comprising:

a task identification information storage part for storing in memory task identification information correlating each of the work areas in the work site with task contents of tasks performed in the work area;

a worker position identification part for identifying a specific work area where a worker is currently present based upon outputs from worker detection part installed in each work area;

a current task identification part for identifying the task currently performed by the worker in correspondence to the work area where the worker is located which is identified by the worker position identification part based upon the task identification information stored at the task identification information storage part;

a task priority level information storage part for storing in memory task priority information;

a new task detection part for detecting that a new task has arisen;

a task reassignment part for reassigning all tasks for the entire personnel starting with a task with a highest priority level when a new task is detected by the new task detection part by engaging the current task identification part to identify the tasks all the workers are currently performing and assigning task priority levels to all the tasks including the current tasks and the new task based upon the task priority level information stored at the task priority level information storage part; and an instruction part for issuing instructions for all the workers to perform the tasks assigned by the task reassignment part.

In the worker management apparatus according to the present invention described above, when a new task has arisen, the tasks all the workers are currently performing are detected and all the tasks including the current tasks and the new task are reassigned. As a result, better suited workers can be assigned to all the tasks including the new task. Thus, since the individual workers are assigned to tasks for which they are most needed, more efficient task assignment and more efficient work execution are achieved.

The task reassignment part in the worker management apparatus described above may designate a task with a highest task priority level as a new task and the worker management apparatus may further include a worker skill information storage part for storing in memory worker skill information correlating each of the workers with tasks that the worker is capable of performing;

a worker extraction part for extracting workers capable of performing the new task detected based upon the worker skill information stored at the worker skill information storage part; and a worker identification part for executing worker identification executing worker identification processing by engaging the current task identification part to identify current tasks being performed by the workers extracted by the worker extraction part, ascertaining and comparing priority levels of the current tasks and a priority level of the new task based upon the task priority level information stored at the task priority level information storage part and identifying a worker performing a current task with a priority level lower than the priority level of the new task as a worker to take on the new task. The apparatus, capable of selecting a best suited worker to undertake an important task with a higher priority level, makes it possible to assign the individual workers to tasks where they are most needed to optimize task assignment and improve work efficiency.

In yet another aspect of the present invention, the object described above is achieved through a worker management apparatus that manages workers performing tasks at a work site divided into a plurality of work areas each in correspondence to specific task contents comprising;

a task identification information storage part for storing in memory task identification information correlating each of the work areas in the work site with task contents of tasks performed in the work area;

a worker position identification part for identifying a specific work area where a worker is currently present based upon outputs from worker detection part installed in each of the work areas;

a current task identification part for identifying the task currently performed by the worker in correspondence to the work area where the worker is located which is identified by the worker position identification part based upon the task identification information stored at the task identification information storage part;

a task information storage part for storing in memory, over predetermined intervals, current tasks all the workers are performing which are identified by the current task identification part; and a task report preparation part for preparing a task report including contents of tasks performed by a specific worker based upon the task information stored at the task information storage part over the predetermined intervals.

In the worker management apparatus according to the present invention described above, a task report such as a daily task report, a monthly task report or the like can be prepared with ease. Furthermore, since the tasks performed by each worker are automatically detected to generate task information based upon which a worker report is filed, the worker does not need to make entries at a portable information terminal or the like each time he undertakes a new task and thus, work efficiency is improved. In addition, since an objective task report instead of a subjective report compiled by the worker himself is provided, an accurate task report is available at all times.

The task report preparation part may also store in memory a task unit price to be charged when each task is performed and may prepare a task report that contains task unit prices of tasks and the grand total of the task unit prices. The work site may be a semiconductor manufacturing plant, and in such a case, a worker may be personnel dispatched from a company other than the company that owns the work site, i.e., the semiconductor manufacturing plant. The worker management apparatus adopted in this application makes it possible for the dispatched worker to print out in a task report the task unit prices of the various tasks and the grand total of the unit prices and bill the client company for fees corresponding to tasks having been performed based upon the grand total.

In yet another aspect of the present invention, the object described earlier is achieved through a worker management method for managing workers who perform tasks in a work site divided into a plurality of work areas each in correspondence to specific task contents, comprising;

a worker position identification step in which a specific work area where a worker is currently present is identified based upon outputs from worker detection part installed in each work area;

a current task identification step in which the task currently performed by the worker present in the work area identified through the worker position identification step is identified based upon task identification information available at a task identification information storage part for storing in memory task identification information correlating each of the work areas at the work site with task contents of the tasks performed in the work areas;

a decision-making step in which a decision is made as to whether the worker should continue performing the current task or should be assigned a new task based upon the current task identified through the current task identification step; and an instruction step in which an instruction for task execution is issued to the worker based upon the results of the decision made in the decision-making step.

Through the worker management method according to the present invention described above, the area (location) at which a given worker is currently present is detected, and in reference to tasks correlated with the area, the specific task that the worker is currently performing can be ascertained with ease. As a result, if, for instance, a new task arises, the new task can be assigned or all the tasks can be reassigned with ease, which makes it possible to assign the optimal worker to each task and improve the work efficiency of the individual workers.

In yet another aspect of the present invention, the object described earlier is achieved through a worker management method for managing workers who perform tasks in a work site divided into a plurality of work areas each in correspondence to specific task contents, comprising a worker position identification step in which a specific work area where a worker is currently present is identified based upon outputs from worker detection part installed in each work area;

a current task identification step in which the task currently performed by the worker present in the work area identified in the worker position identification step is identified based upon the task identification information available at a task identification information storage part for storing in memory task identification information correlating each of the work areas at the work site with task contents of tasks performed in the work area;

a new task detection step in which a new task having arisen is detected;

a worker extraction step in which workers capable of performing the new task detected in the new task detection step are extracted based upon worker skill information at a worker skill information storage part for storing in memory worker skill information correlating each of the workers with tasks that the worker is capable of performing;

a worker identification step in which worker identification processing is executed by identifying through the current task identification step current tasks performed by the workers extracted in the worker extraction step, ascertaining and comparing priority levels of the current tasks and a priority level of the new task based upon task priority level information available at the task priority level information storage part for storing in memory task priority level information and identifying a worker performing a current task with a priority level lower than the priority level of the new task as a worker to take on the new task; and an instruction step in which an instruction to perform the new task is issued to the worker identified in the worker identification step.

Through the worker management method according to the present invention described above, the priority levels of the current tasks having been detected are compared with the priority level of the new task and an instruction is issued to a worker performing a task with a priority level lower than the priority level of the new task to take on the new task. Since a decision is made as to whether or not a given worker should be assigned a new task having arisen based upon the priority levels of the new task and the current task, a task with a higher priority level, i.e., a more important task, can be undertaken more promptly. As a result, by placing individual workers on tasks where they are most needed, optimal task assignment is achieved.

The worker skill information storage part used in the worker management method described above may store in memory information indicating a classified worker category in correspondence to each worker, and the worker management method may further include a priority rank assignment step in which information indicating the specific worker category corresponding to each of the workers extracted through the worker extraction step, which is available at the worker skill information storage part having stored therein task skill information correlating each task with worker categories of skills required for execution of the task is obtained, a classified worker category corresponding to the new task is ascertained based upon the task skill information at the task skill information storage part and priority ranks are assigned to the workers by giving a higher priority rank to a worker in a worker category matching the worker category corresponding to the new task having been ascertained. In this case, the worker identification processing may be executed in the worker identification step starting with a worker with the highest priority rank assigned through the priority level assignment step among the workers extracted in the worker extraction step. Through the method, the worker best suited to take on the new task can be selected even faster and the individual workers can be assigned to tasks for which they are most needed.

In yet another aspect of the present invention, the object described earlier is achieved through a worker management method for managing workers who perform tasks in a work site divided into a plurality of work areas each in correspondence to specific task contents, comprising;

a worker position identification step in which a specific work area where a worker is currently present is identified based upon outputs from worker detection part installed in each work area;

a current task identification step in which the task currently performed by the worker present in the work area identified in the worker position identification step is identified based upon the task identification information available at a task identification information storage part for storing in memory task identification information correlating each of the work areas at the work site with task contents of tasks performed in the work area;

a new task detection step in which a new task having arisen is detected, a task reassignment step in which all tasks are reassigned for all personnel starting with a task with a highest priority level when a new task is detected in the new task detection step by identifying current tasks being performed by all the workers through the current task identification step and assigning task priority levels to all the tasks including the current tasks and the new task based upon task priority level information available at a task priority level information storage part for storing in memory task priority level information and an instruction step in which instructions are issued to all the workers to perform the tasks assigned through the task reassignment step.

Through the worker management method according to the present invention described above, when a new task has arisen, the tasks all the workers are currently performing are detected and all the tasks including the current tasks and the new task are reassigned. As a result, better suited workers can be assigned to all the tasks including the new task. Thus, since the individual workers are assigned to tasks for which they are most needed, more efficient task assignment and more efficient work execution are achieved.

In the task reassignment step in the worker management method described above, a task with a highest task priority level may be designated as a new task and the worker management method may further include a worker extraction step in which workers capable of performing the new task are extracted based upon worker skill information stored at a worker skill information storage part for storing in memory worker skill information correlating each of the workers with tasks that the worker is capable of performing, and a worker identification step in which worker identification processing is executed by identifying through the current task identification step current tasks being performed by the workers extracted in the work or extraction step, ascertaining and comparing priority levels of the current tasks and a priority level of the new task based upon the task priority level information stored at the task priority level information storage part and identifying a worker performing a current task with a priority level lower than the priority level of the new task as the worker to take on the new task. Since this ensures that an optimally qualified worker is selected to undertake an important task with a higher priority level, the individual workers are assigned to tasks for which there are most needed to optimize the task assignment and improve the work efficiency.

In yet another aspect of the present invention, the object described earlier is achieved through a worker management method for managing workers who perform tasks in a work site divided into a plurality of work areas each in correspondence to specific task contents, comprising;

a worker position identification step in which a specific work area where a worker is currently present is identified based upon outputs from worker detection part installed in each work area;

a current task identification step in which the task currently performed by the worker present in the work area identified in the worker position identification step is identified based upon the task identification information available at a task identification information storage part for storing in memory task identification information correlating each of the work areas at the work site with task contents of tasks performed in the work area;

a task information storage step in which current tasks being performed by all the workers are identified through the current task identification step and the current tasks thus identified are stored into memory in correspondence to the individual workers over predetermined time intervals; and a task report preparation step in which a task report containing contents of tasks performed by a desired worker is prepared based upon the task information having been stored in memory over the predetermined time intervals in the task information storage step.

Through the worker management method according to the present invention described above, a task report such as a daily task report, a monthly task report or the like can be prepared with ease. Furthermore, since the tasks performed by each worker are automatically detected to generate task information based upon which a worker report is filed, the worker does not need to make entries at a portable information terminal or the like each time he undertakes a new task and thus, work efficiency is improved. In addition, since an objective task report instead of a subjective report compiled by the worker himself is provided, an accurate task report is available at all times.

In the task report preparation step, a task unit price to be charged when each task is performed may also be stored in memory and a task report that contains task unit prices of tasks and the grand total of the task unit prices may be prepared. The work site may be a semiconductor manufacturing plant, and in such a case, a worker may be personnel dispatched from a company other than the company that owns the work site, i.e., the semiconductor manufacturing plant. The worker management method adopted in this application makes it possible for the dispatched worker to print out in a task report the task unit prices of the various tasks and the grand total of the unit prices and bill the client company for fees corresponding to the tasks having been performed based upon the grand total.

It is to be noted that in the worker management systems, the worker management apparatuses and the worker management methods described above, the worker detection part may each include a receiver that receives electromagnetic waves transmitted from transmitters carried by the individual workers, the transmitters may each be set so as to transmit an electromagnetic wave with a frequency unique to a specific worker and the worker position identification part may determine the worker detection part having received an electromagnetic wave with the frequency assigned to a worker undergoing a work area detection and identify the work area in which the worker detection part is installed as the work area where the worker is present. Since these features facilitate the detection of the exact work area where a given worker is currently located, the task that the worker is currently performing can be detected with ease based upon the work area information.

Alternatively, in the worker management systems, the worker management apparatuses and the worker management methods described above, the worker detection part may each include a receiver that receives electromagnetic waves transmitted from transmitters carried by individual workers, the transmitters may each be set so as to transmit an electromagnetic wave carrying identification information that can be used to identify a specific worker, and the worker position identification part may obtain worker identification information from the worker detection part, determine the worker detection part having received the worker identification information corresponding to a worker undergoing a work area detection and identify the work area in which the worker detection part is installed as the work area where the worker is present. These features, too, facilitate the detection of the exact work area where a given worker is currently located, and the task that the worker is currently performing can be detected with ease based upon the work area information.

Furthermore, in conjunction with the worker management systems, the worker management apparatuses and the worker management methods described above, a task information acquisition part for obtaining worker task information from work devices installed in the work areas may be further provided, and the current task identification part may obtain task information (task information related to the device and may also be referred to as "device information" in the specification) originating at a work device at which the worker is performing a task from the task information acquisition part in addition to the work area information indicating the work area identified as the work area in which the worker is currently present and identify the current task being performed by the worker based upon the area information and the task information. These features enable a fairly detailed detection of task contents (e.g., a specific classified task category such as troubleshooting or a normal operation task) based upon the work area information indicating the work area where a given worker is currently located, and further enable an even more detailed detection of the task contents (e.g., electrical system troubleshooting work or mechanical system troubleshooting) based upon the task information.

BRIEF DESCRIPTION OF THE DRAWINGS

FIG. 5 presents an example of the task identification information database used in the embodiment;

FIG. 6 presents an example of the task priority level information database used in the embodiment;

FIG. 7 presents an example of the task skill information database used in the embodiment;

FIG. 8 presents an example of the worker skill information database used in the embodiment;

FIG. 9 presents an example of the error code information database used in the embodiment;

FIG. 10 presents an example of the inspection results information database used in the embodiment;

FIG. 19 presents an example of a daily task report that may be prepared in the embodiment.

DETAILED DESCRIPTION OF THE PREFERRED EMBODIMENTS

Figure 1:
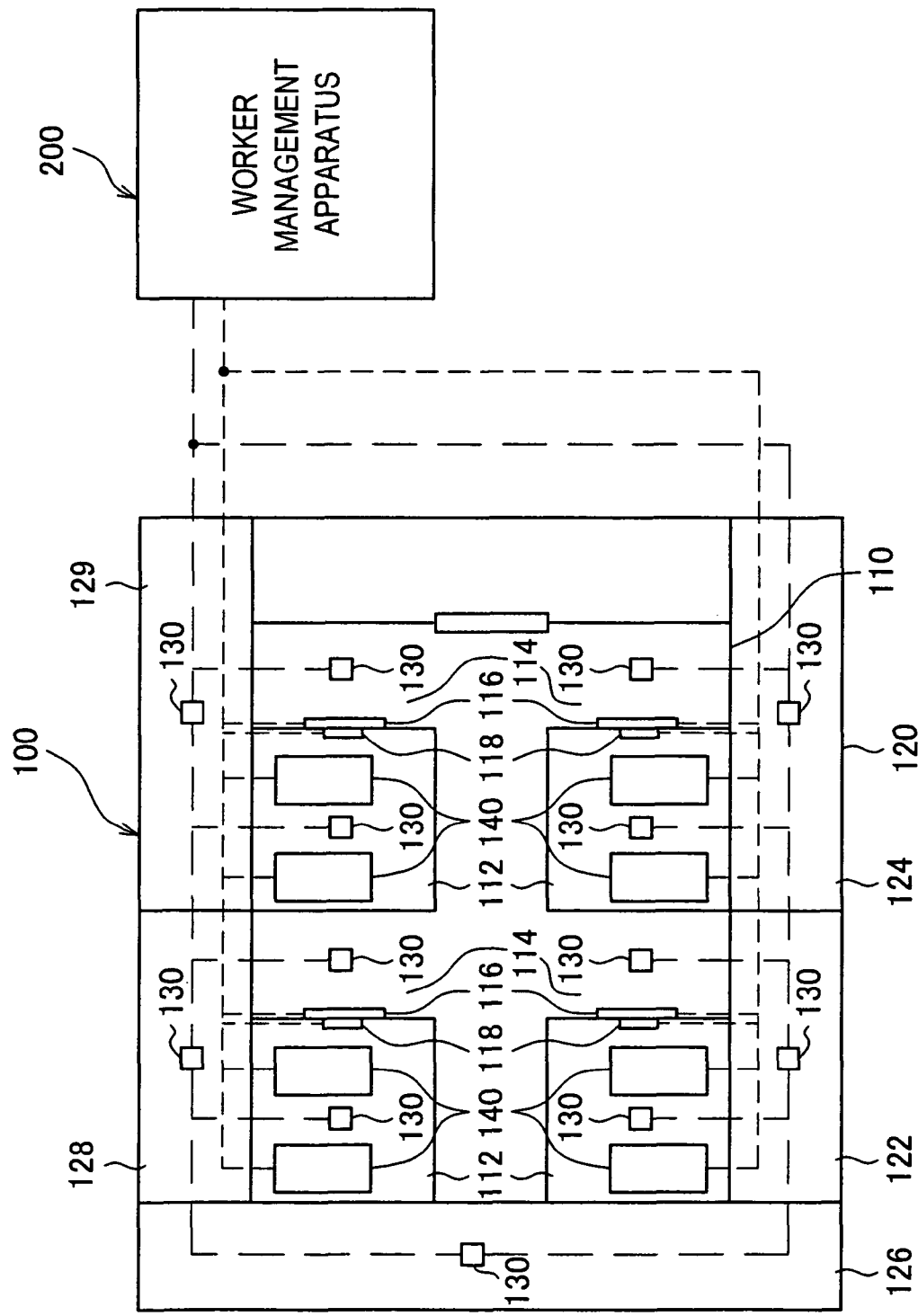
FIG. 1 is a block diagram of the overall structure adopted in the worker management system achieved in a first embodiment of the present invention.

The following is a detailed explanation of the preferred embodiments of the present invention, given in reference to the attached drawings. It is to be noted that in the specification and the drawings, the same reference numerals are assigned to components achieving substantially identical functions or structural features to preclude the necessity for a reputed explanation thereof.

First Embodiment

First, the worker management system achieved in the first embodiment by adopting the present invention in a semiconductor manufacturing plant is explained in reference to drawings. FIG. 1 shows an example of a floor plan inside a semiconductor manufacturing plant 100 which constitutes the work site in the embodiment by way of showing the overall structure adopted in the worker management system at the semiconductor manufacturing plant. Reference numeral 200 indicates a worker management apparatus.

As shown in FIG. 1, the area inside the semiconductor manufacturing plant 100 is largely divided into two areas, i.e., a clean room area 110 and an area 120 excluding the clean room (hereafter referred to as a "non-clean room area").

The clean room area 110 is further divided into a plurality of equipment room areas 112 and an area other than the equipment rooms (hereafter referred to as a "non-equipment room area"). Semiconductor manufacturing devices 140 such as processing devices and measuring devices are installed in the equipment room areas 112. The processing devices installed in the equipment room areas may be, for instance, etching devices, CVD (chemical vapor deposition: chemical vapor phase epitaxy) devices, coater/developers, washing devices, CMP (chemical mechanical polishing) devices, PVD (physical vapor deposition: physical vapor phase epitaxy) devices, exposure devices and ion implanters. Measuring devices installed in the equipment room areas may be, for instance, film thickness measuring devices, ODP (optical digital profiler) devices or FTIR devices. It is to be noted that the individual equipment room areas 112 may each house specific types of semiconductor manufacturing devices or a plurality of different types of semiconductor manufacturing devices 140 may be installed in each equipment room area 112.

In each equipment room area 112, a inside control unit 116 that controls the semiconductor manufacturing devices 140 within the equipment room area 112 when performing tasks such as maintenance and regular inspections is installed, and the inside control unit 116 is used to control the semiconductor manufacturing devices 140 in the equipment room. Outside control units 118 for implementing control on the semiconductor manufacturing devices 140 from outside the equipment rooms may also be provided. Alternatively, the semiconductor manufacturing devices 140 may each include a control unit to enable control of the semiconductor manufacturing device through the built-in control unit. The inside control units 116, the outside control units 118 and any other control units may each be constituted with an operation panel. These control units 116 and 118 and the semiconductor manufacturing devices 140 are electrically connected with an input/output unit 208 of the worker management apparatus 200 through a communication network or the like so as to exchange device information (task information with regard to the tasks performed on the devices) such as access information and device status information. When controlling a semiconductor manufacturing device or the like through one of the control units described above, the semiconductor manufacturing device is accessed by entering an ID and a password assigned to the worker via the control unit in correspondence to the specific task to be performed on the semiconductor manufacturing device. As a result, the identity of the specific worker controlling the device can be ascertained.

The outside control units 118 are installed in the non-equipment room area 114 in the embodiment. It is to be noted that the non-equipment room area 114 does not need to be the area where the outside control units 118 are installed and may include a passageway formed between the individual equipment room areas 112.

The non-clean room area 120 is the area inside the plant excluding the clean room. The non-clean room area 120 may include, for instance, a central monitor room area 122, a utility room area 124, a warehousing area 126, an office area 128 and a staff lounge area 129 (which may include bathrooms and the like).

A worker detection sensor 130 constituting a worker detection part for detecting a worker is installed in each of the various areas, i.e., the equipment room areas 112 and the non-equipment room area 114 inside the clean room area 110, and the central monitor room area 122, the utility room area 124, the warehousing area 126, the office area 128 and the staff lounge area 129 in the non-clean room area 120. The worker detection sensor 130 is electrically connected via a communication cable or the like with the input/output unit 208 of the worker management apparatus 200 to enable exchange of sensor information originating from the worker detection sensor 130.

The worker detection sensor 130 may be constituted with, for instance, a sensor that receives an electromagnetic wave (or a radio wave) transmitted from a transmitter carried by each worker. The worker detection sensor 130 may be mounted at, for instance, the ceiling or a wall in each area.

Figure 2:
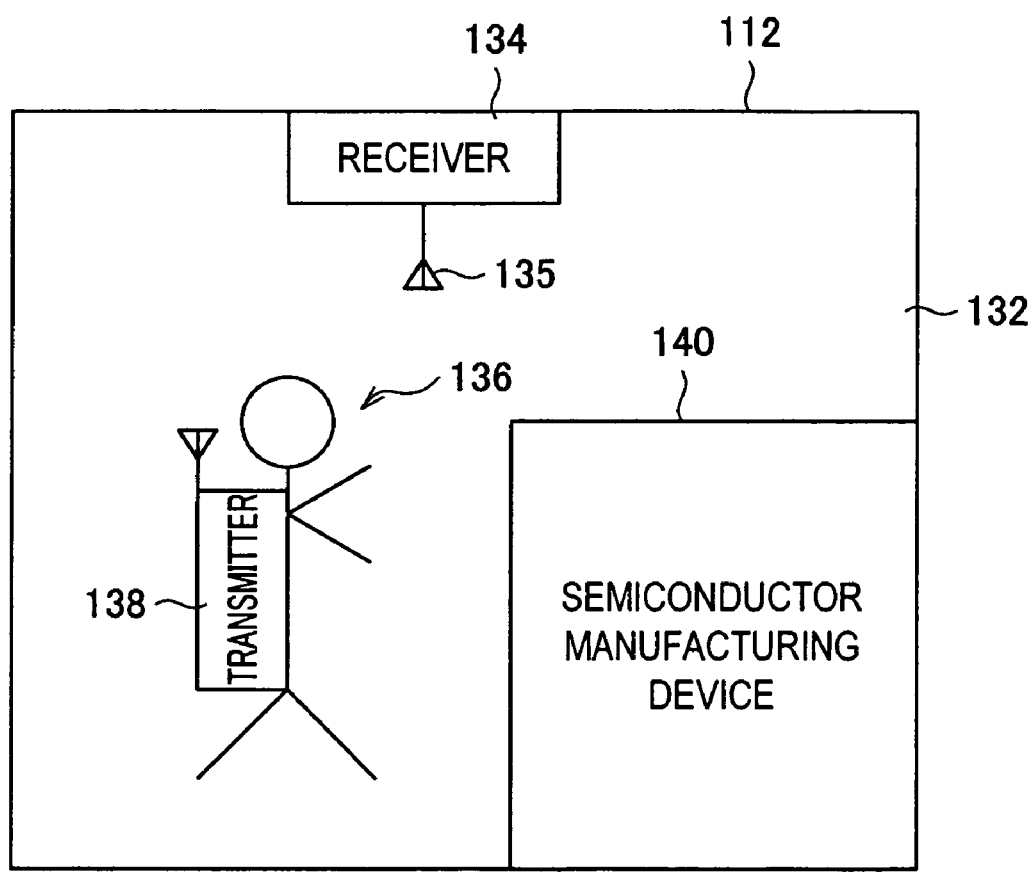
FIG. 2 illustrates how the features of the embodiment are put to work inside an equipment room in the clean room.

FIG. 2 shows an example in which the worker detection sensor 130 is embodied as a receiver 134 installed in an equipment room area 112 in the clean room area 110. The receiver 134 is mounted at the ceiling of an equipment room 132 defining the equipment room area 112. A worker 136 carrying a transmitter 138 at all times performs a task on a semiconductor manufacturing device 140 or the like. As the worker 136 enters the equipment room 132 in order to perform, for instance, a maintenance task on the semiconductor manufacturing device 140, the receiver 134 installed at the ceiling receives the electromagnetic wave from the transmitter 138 carried by the worker. The presence of the worker 136 in the equipment room area 112 is thus detected.

The transmitters 138 in the embodiment may transmit electromagnetic waves with frequencies (wireless frequencies) that are varied in correspondence to the individual workers. In such a case, frequency information correlating each worker with the frequency assigned to the worker is stored in memory at a frequency information database embodying an example of a frequency information storage part. This frequency information database may be achieved as part of various databases 210 shown in FIG. 3. Based upon the frequency information stored at the frequency information database, the worker present in the work area where a given worker detection sensor 130 is installed can be identified in correspondence to the frequency of the electromagnetic wave received at the worker detection sensor 130. The worker management apparatus 200 determines the worker detection sensor 130 having received the electromagnetic wave with a frequency corresponding to the worker who is the work area detection target based upon the sensor information provided by the individual worker detection sensors 130 and identifies the work area where the worker detection sensor 130 is installed as the work area in which the target worker is present.

Alternatively, the transmitters 138 may each transmit an electromagnetic waves achieved by converting through modulation or the like coded ID data as identification information to be used to identify the specific worker and the receiver 134, in turn, may transmit to the worker management apparatus 200 decoded ID data achieved by, for instance, demodulating the electromagnetic waves received from the transmitter 138 as sensor information. Worker IDs are stored in memory at a worker skill information database 250 shown in FIG. 8. By referring to IDs (identification information) stored in memory at the worker skill information database 250, any worker present in the work area where a specific worker detection sensor 130 is installed can be identified based upon the ID (identification information) received from the worker detection sensor 130. The worker management apparatus 200 determines the worker detection sensor 130 having received the ID (identification information) of the worker who is the work area detection target based upon the sensor information provided by the individual worker detection sensors 130 and identifies the work area where the worker detection sensor 130 is installed as the work area in which the target worker is present. It is to be noted that the transmitters 138 may each be constituted with a portable telephone or a portable information terminal, as detailed later. In addition, both the receivers 134 and the transmitters 138 may each be constituted with a transceiver. A specific example of such an application is to be detailed later.

In addition, the ID (identification information) of each worker may be stored in advance in memory at a storage part (not shown) in the transmitter 138 carried by the worker, or bar-coded ID information may be read and stored into the storage part in the transmitter 138. In more specific terms, the transmitter 138, which may be constituted with, for instance, a portable telephone or a portable information terminal, may include a barcode reading part such as an infrared reading part so as to read the bar-coded ID information with the barcode reading part to store the ID information thus read out into the storage part at the transmitter 138.

(Worker Management Apparatus)

Figure 3:
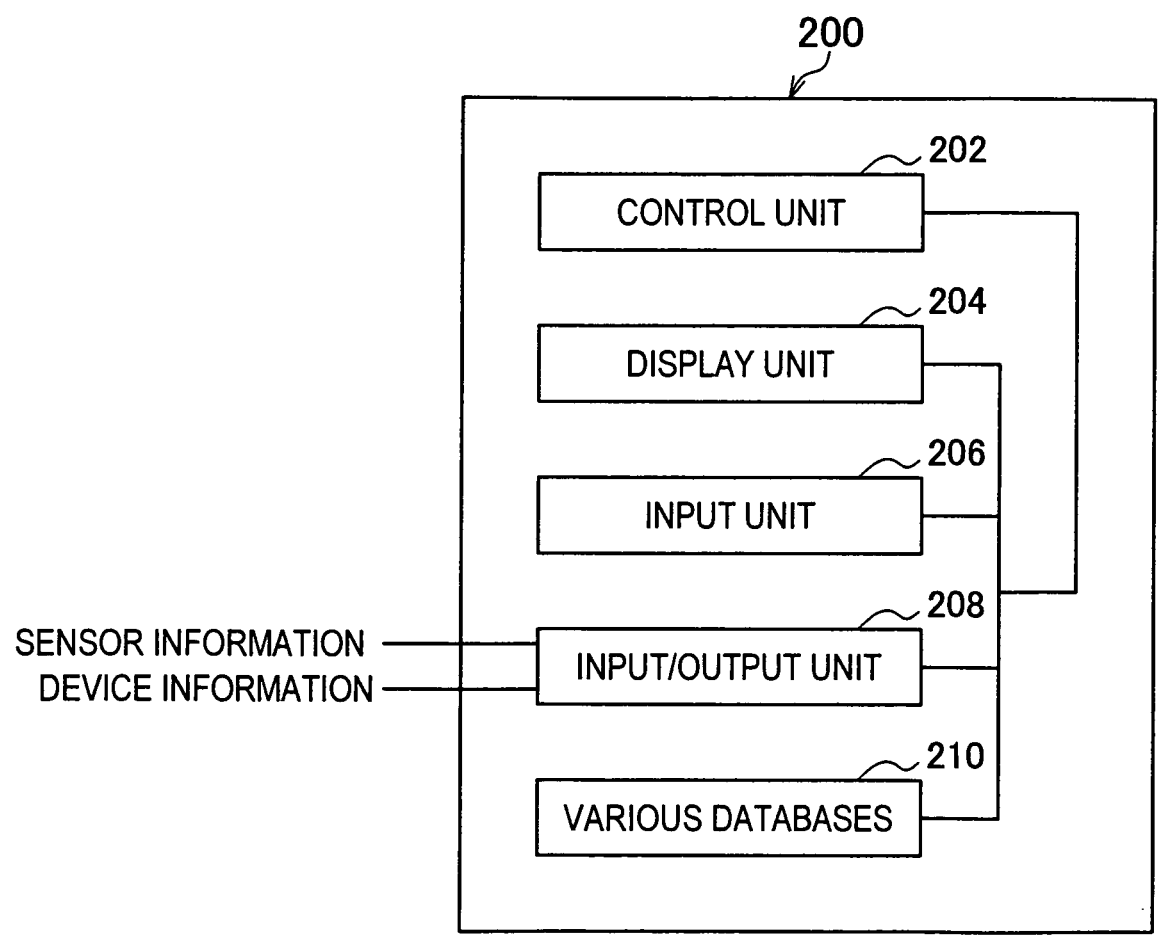
FIG. 3 is a block diagram of the structure adopted in the worker management apparatus achieved in the embodiment.

Based upon data input thereto from, for instance, the worker detection sensors 130 described above, the worker management apparatus 200 detects the areas where the individual workers are currently located. As shown in FIG. 3, the worker management apparatus 200 includes a control unit 202 having a CPU (central processing unit) and memory units such as a ROM (read-only memory) and a RAM (random access memory), a display unit 204 at which various types of information are displayed, an input unit 206 through which various types of data are input, the input/output unit 208 to which the data provided by the worker detection sensors 130 are input and various databases 210, as well as a storage part (not shown) such as a hard disk device in which programs and the like are stored. In a memory at the control unit 202, programs and data to be accessed by the CPU are stored and programs stored in the recording medium such as the hard disk device mentioned above are read out and stored into memory at the control unit 202 as necessary, for instance.

Figure 4:
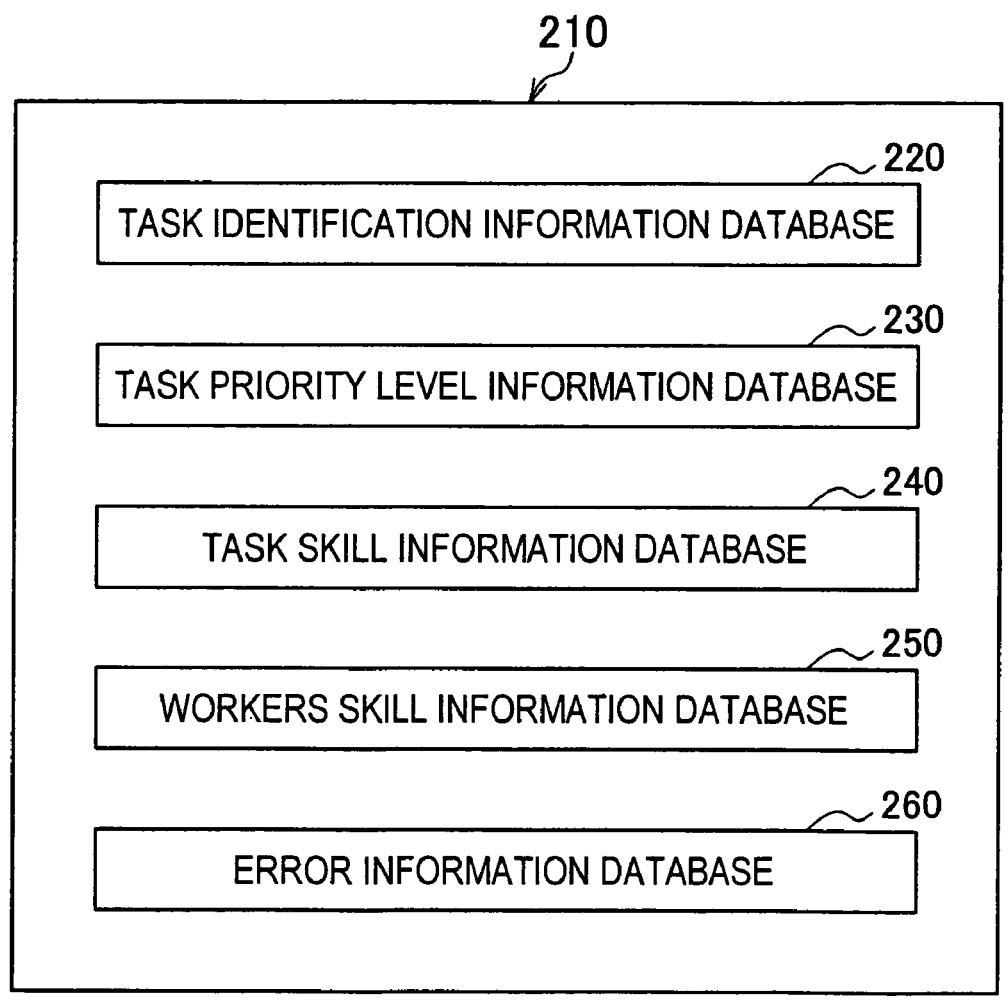
FIG. 4 is a block diagram presenting an example of the various databases in FIG. 3.

The various databases 210 mentioned above include a task identification information database 220, a task priority level information database 230, a task skill information (work skill information) database 240, a worker skill information database 250 and a trouble information (error information) database 260, as shown in FIG. 4.

(Task Identification Information Database)

As shown in FIG. 5, task identification information correlating area information 222, device information (task information indicating tasks performed on the individual devices) 224 and task contents 226 is stored in the task identification information database 220. The task identification information is used when, for instance, identifying the specific task being performed by a given worker. More specifically, the task (current task) currently performed by the worker is identified by using the area information indicating the area where the worker is located, which is detected with a worker detection sensor 130, and the task identification information such as access information indicating access to a specific semiconductor manufacturing device 140.

The area information 222 indicates each of the various areas in the plant shown in FIG. 1. The areas indicated by the area information in the embodiment are the equipment room areas 112 and the non-equipment room area 114 inside the clean room area 110 and the central monitor room area 122, the utility room area 124, the warehousing area 126, the office area 128 and the staff lounge area 129 in the non-clean room area 120.

The device information 224 includes access information indicating access to the control units such as the inside control units 116 and the outside control units 118 operated to control the semiconductor manufacturing devices 140, abnormal state warning information indicating an alarm generated for a semiconductor manufacturing device 140 or an ON state of a lamp in the event of an abnormal state and maintenance request information indicating an alarm generated for a semiconductor manufacturing device 140, and ON state a lamp or the like detected when maintenance work needs to be performed on the semiconductor manufacturing device 140. The control unit access information may indicate, for instance, whether or not a specific control unit has been accessed in order to perform a task such as maintenance on the semiconductor manufacturing device 140. The task contents 226 indicate types of tasks performed in the individual areas.

Examples of specific task contents 226 corresponding to the individual areas are now explained in reference to FIG. 5. The tasks performed in the equipment room areas 112 in the clean room area 110 include troubleshooting tasks (troubleshooting maintenance) and routine tasks.

A troubleshooting task indicated in the task contents corresponding to the equipment room areas 112 is performed to eliminate trouble having occurred in a semiconductor manufacturing device 140 in an equipment room area 112. Such a troubleshooting task may be an electrical system troubleshooting task performed when an abnormal state has occurred in the electrical system of the device, a mechanical system troubleshooting task performed when an abnormal state has occurred in the mechanical system in the device or a process system troubleshooting task performed when an abnormal state has occurred during a process such as an etching process. When trouble occurs at any of the semiconductor manufacturing devices 140, an alarm generated by a warning part included in the device, a lamp turned on by a lamp switch part and the like indicate the occurrence of trouble and the type of trouble having occurred.

Accordingly, if the task identification information indicates that trouble has occurred when a worker is determined to be currently present in an equipment room area 112, the worker can be judged to be performing a troubleshooting task. In this situation, further details of the troubleshooting task can be ascertained based upon the trouble type (e.g., trouble in the electrical system, the mechanical system or the process system) indicated in the task identification information. It is to be noted that since the worker will normally access the semiconductor manufacturing device 140 via the inside control unit 116 or the like to switch to a maintenance mode and then perform a task such as a check in response to a warning (alarm) generated at the semiconductor manufacturing device 140, the worker may instead be judged to be performing a troubleshooting task based upon the access information corresponding to the worker.

The routine tasks indicated in the task contents corresponding to the equipment room areas 112 may include, for instance, part replacements and wet cleaning performed on the semiconductor manufacturing devices 140. A worker opens up the processing chamber of a semiconductor manufacturing device 140 in an equipment room area 112 for wet cleaning which is performed by using a chemical solution. While the wet cleaning task is cited as a routine task performed in the equipment room areas 112, the present invention is not limited to this example. It is to be noted that when replacing a part in a semiconductor manufacturing device or wet cleaning the semiconductor manufacturing device, too, the semiconductor manufacturing device 140 may be accessed to generate a maintenance alert by outputting a warning (alarm) or turning on a lamp or to perform the task by switching to the maintenance mode via the inside control unit 116 or the like. For this reason, the worker determined to be present in the equipment room area 112 can be judged to be engaged in a routine task based upon the task identification information that includes the access information and the maintenance warning information.

Next, tasks performed in the non-equipment room area 114 in the clean room area 110 include regular operation tasks, routine tasks and other tasks. The regular operation tasks include, for instance, tasks for entering process conditions and the like as semiconductor device production instructions from an outside control unit 118, setting a carrier (FOUP) having held therein semiconductor wafers and transporting the carrier. It is to be noted that while the carrier (FOUP) is set and transported inside an equipment room area 112, the subsequent semiconductor device production instructions and the like are issued from the outside control unit 118, and for this reason, they are designated as tasks performed in the non-equipment room area 114. However, if these tasks are performed strictly within the equipment room areas 112, they may be designated as tasks performed in the equipment room areas 112.

Since a regular operation task is normally performed by accessing a semiconductor manufacturing device 140 via the outside control unit 118 or the like, a worker can be judged to be performing a regular operation task based upon the access information when the worker is determined to be located in the equipment room area 112. The routine tasks performed in the non-equipment room area 114 include, for instance, dry cleaning and seasoning performed on the semiconductor manufacturing devices 140. A semiconductor manufacturing device 140 is normally accessed from the outside control unit 118 or the like to dry clean the processing chamber and the like of the semiconductor manufacturing device 140 by entering the necessary information via the outside control unit 118. While the dry cleaning task is cited as a routine task performed in the non-equipment room area 114, the present invention is not limited to this example.

Miscellaneous tasks performed in the non-equipment room area 114 (falling into the miscellaneous task category among the task categories in FIG. 6 to be detailed later) include monitoring of the semiconductor manufacturing devices 140 and cleaning of the work environment. If no task identification information such as access information or maintenance warning information is generated when a worker is determined to be present in the non-equipment room area 114, the worker can be judged to be engaged in a miscellaneous task. The worker may enter the task contents indicating monitoring, cleaning or the like from his portable information terminal, for instance, so as to enable the worker management apparatus to ascertain further details of the task he is performing. The information indicating the task contents entered by the worker may be used as task identification information as well.

The tasks performed in the non-clean room area 120 include tasks performed in the central monitor room area 122, the utility room area 124, the warehousing area 126 and the office area 128. These tasks all fall into the miscellaneous task category among the task categories in FIG. 6 to be detailed later. When a worker is located in the staff lounge area 129, he is assumed to be taking a break or using the washroom. The tasks performed in the central monitor room area 122, the utility room area 124, the warehousing area 126 and the office area 128 include production preparation tasks (may be referred to as process management tasks, instead). Production preparation tasks include the overall semiconductor device production is monitored and specific task contents are modified as necessary in coordination with the production schedule (production process plan) in the central monitor room area 122, parts management tasks and the like are performed in the warehousing area 126 and parts are ordered and other miscellaneous tasks are performed in the office area 128. In the utility room area 124, troubleshooting tasks are performed in response to any failure of air cleaners and the like inside the clean room and routine tasks such as routine maintenance on the air cleaners and the like are also performed. As a result, based upon the specific area in which a given worker is currently located, the task being performed by the worker can be determined.

It is to be noted that while tasks performed inside the plant are explained above, there are tasks performed outside the plant, such as supervising deliveries of chemicals used for cleaning purposes and the like into chemical tanks. Accordingly, if the presence of a worker is detected in an area outside the plant, the worker can be judged to be performing an out-plant task. A worker can be determined to be present in an out-plant area if the worker has reported for work but his presence cannot be detected with any of the worker detection sensors 130 installed in the plant.

As described above, the task currently being performed by a given worker is identified based upon the task identification information that includes the area information 222 and the device information 224. The workers current task can be roughly determined based upon the area information 222 indicating the area where the worker is located and more specific details of the task being performed can be ascertained based upon the device information 224 such as the access information. However, the present invention is not limited to this example and the current task may be identified based upon task identification information constituted with the area information 222 alone. For instance, fairly specific details of the current task may be ascertained based upon the area information 222 alone by dividing each area inside and outside the plant into smaller sub-areas. Alternatively, the current task may be identified based upon task identification information constituted with the device information 224 such as access information alone.

(Task Priority Level Information Database)

Task priority level information containing priority (priority level) information that indicates priority levels assigned to tasks each belonging to one of primary task categories is stored in memory at the task priority level information database 230. The data stored in the task priority level information database are constituted with priority level information 232 indicating various priority levels from priority 1, which is the highest priority through priority 5, which is the lowest priority, and task category information 234, as shown in FIG. 6.

Emergency tasks fall into the task category corresponding to the highest priority, i.e., priority 1. The emergency tasks include firefighting work performed in the event of a fire and gas leak response work performed in the event of a gas leak in response to an alarm issued from a gas detector. These tasks can be identified based upon the states of hazard sensors such as fire detectors installed in the individual equipment room areas 112, for instance.

Troubleshooting tasks performed to eliminate trouble occurring at the semiconductor manufacturing devices 140 in the equipment room areas 112 fall into the task category corresponding to priority 2. The troubleshooting tasks include troubleshooting tasks performed in the equipment room areas 112 in the clean room area 110 shown in FIG. 5. These troubleshooting tasks include maintenance work performed to eliminate electrical system trouble, mechanical system trouble or process system trouble as described earlier. The troubleshooting tasks also include those performed in the utility room area 124 to eliminate trouble in an electrical system such as an air cleaner or trouble in a mechanical system. Unless these tasks are performed, the semiconductor device production does not run smoothly, the quality of the finished semiconductor device products is bound to become low and a desired level of yield cannot be maintained. For this reason, the second highest priority, only after the emergency tasks, is given to the troubleshooting tasks.

Regular operation tasks fall in the task category corresponding to priority 3. The regular operation tasks include regular operation tasks performed in the non-equipment room area 114 in the clean room area 110 shown in FIG. 5. As the regular operation tasks, process conditions are entered as the semiconductor device production instructions, a carrier (FOUP) containing therein semiconductor wafers is set and the carrier is then transported. In principle, priority is given to the regular operation tasks under normal circumstances unless trouble has occurred, since the regular operation tasks need to be performed to produce semiconductor devices.

Routine tasks fall into the task category corresponding to priority 4. The routine tasks include both routine tasks performed in the equipment room areas 112 in the clean room area 110 and routine tasks performed in the non-equipment room area 114 in the clean room area 110 in FIG. 5. As the routine tasks, maintenance work is performed on the semiconductor manufacturing devices, e.g., wet cleaning, dry cleaning and part replacements, as explained earlier. The routine tasks also include routine maintenance of the air cleaners or the like in the utility room area 124. In the embodiment, lower priority compared to the priority given to the regular operation tasks is given to the routine tasks since they should not be given precedence over the semiconductor device production. However, the present invention is not limited to this example, and routine tasks may instead be performed with optimal timing by checking the overall production schedule or the relevant portion of the production schedule during the semiconductor device manufacturing process, regardless of the priority level assigned to them. In such a case, a worker having process management skills may check the overall production schedule or the relevant portion of the production schedule to determine the optimal timing with which a routine task should be performed and the priority may be modified to reflect the timing thus determined.

Miscellaneous tasks fall in the task category corresponding to priority 5. The miscellaneous tasks in this context include the tasks performed in the central monitor room area 122, the tasks performed in the warehousing area 126, the tasks performed in the office area 128, the tasks performed in the staff lounge area 129 and the tasks performed in the out-plant area, as well as the miscellaneous non-equipment room tasks performed in the non-equipment room area 114 in the clean room area 110 shown in FIG. 5. Accordingly, the miscellaneous tasks include, for instance, ordering parts, adjusting the semiconductor device schedule, monitoring the semiconductor manufacturing devices 140 and cleaning the work areas.

It is to be noted that while five levels of task priority are set in the embodiment, the present invention is not limited to this example and six or more priority levels may be said or four or fewer priority levels may be set. In addition, various tasks may be classified into categories other than those described above.

(Task Skill Information Database)

In the task skill information database 240, skill information (task skill information) indicating skills needed to perform specific tasks, which is different from skill information (worker skill information) indicating skills of individual workers and stored in the worker skill information database 250 to be detailed later, is stored in memory. More specifically, task skill information correlating tasks 242 with primary worker categories 244, as shown in FIG. 7, is stored in the task skill information database 240.

The task information 242 is subdivided into information indicating task categories 246 and task contents 248 corresponding to the individual task categories 246. The task categories 246 are identical to the task categories 234 in FIG. 6. The optimal worker category 244 indicating optimal workers to undertake a given task is correlated to each task category 246 or the task contents 248 corresponding to the task category.

The emergency tasks such as firefighting should be performed by all the available workers regardless of their worker categories 244. Engineers are the personnel best suited to perform troubleshooting tasks. More specifically, the personnel best suited to perform electrical system troubleshooting tasks are electrical engineers, the personnel best suited to perform mechanical system troubleshooting tasks are mechanical engineers and the personnel best suited to perform process system troubleshooting tasks are process engineers. Since each engineer specializes in a specific field of expertise, it is most desirable to assign an engineer with matching expertise to a given troubleshooting task. However, this does not mean that a troubleshooting task must always be performed by an engineer with the corresponding expertise, but rather, depending upon the engineer availability, the troubleshooting task may be performed by an engineer who does not specialize in the particular field, as long as he is capable of correcting the trouble.

The regular operation tasks are performed to manufacture semiconductor devices with the semiconductor manufacturing devices 140 by, for instance, operating the control units 116 and the like described earlier. For this reason, the regular operation tasks are best performed by workers qualified as operators. However, the regular operation tasks do not always need to be performed by operators. For instance, engineers who normally have operator skills as well may be assigned to regular operation tasks.

The routine tasks are maintenance tasks such as cleaning and part replacements. Accordingly, the personnel best suited to perform the routine tasks are routine task workers. It is to be noted that the routine tasks do not always need to be performed by routine task workers, either. For instance, engineers and operators who normally have routine task worker skills as well may perform the routine tasks.

The miscellaneous tasks include, for instance, semiconductor device production scheduling tasks. Accordingly, the miscellaneous tasks are best performed by miscellaneous tasked workers having skills corresponding to the specific miscellaneous tasks.

(Worker Skill Information Database)

In the worker skill information database 250, worker skill information corresponding to each worker is stored, as shown in FIG. 8. Each set of worker skill information stored in the worker skill information database includes information indicating a filing number 251, the name 252, an ID 253, a password 254, an affiliation 255, a worker category 256 and tasks 257 corresponding to a specific worker. It is to be noted that in addition to these data entries, information indicating the worker's shifts (work periods) and the semiconductor manufacturing device operation schedule may also be stored in memory. In addition, the unit price of a task may be stored in memory in correspondence to each task category. Based upon such task unit prices, fees can be charged in correspondence to the tasks performed by a worker dispatched from another company to a plant, for instance.

The filing number 251 is a serial number assigned to each worker, whereas the name 252 and the ID 253 are used to identify the worker.

As the affiliation 255, the name of the plant, the name of the office, the name of the company or the like with which the worker is affiliated is stored in memory. For instance, if the worker is affiliated with a plant where the worker management system according to the present invention is installed, the name of the plant is stored as the affiliation 255. In addition, if a worker affiliated with another plant is dispatched to the plant where the worker management system according to the present invention is installed, the name of the plant with which the worker is affiliated is stored as the affiliation 255. If an employee of a vendor (sales company) that sells semiconductor manufacturing devices 140 to a customer (purchasing company) is dispatched to work at a plant belonging to the sales company, the name of the sales company is stored as the affiliation.

As the worker category 256, the worker category into which each worker is classified, as shown in FIG. 7, is stored in memory. If a worker has operator skills, he is classified as an operator, whereas a worker with routine task skills is classified as a routine task worker. It is desirable to indicate the specialized field of expertise, e.g., a mechanical engineer, in the case of an engineer.

Each set of task information 257 indicates the tasks a given worker is capable of performing. The tasks indicated in the task information 257 correspond to the tasks 242 in FIG. 7. More specifically, the task information 257 is subdivided into task category information and task contents information. The ability of the worker to perform a task may be indicated by using a symbol o, a symbol Δ or a symbol X. The symbol o indicates that the worker is capable of performing the task, the symbol Δ indicates that the worker is capable of performing the task but does not specialize in that particular field and the symbol X indicates that the worker is not capable of performing the task.

It is to be noted that the task information 242 may indicate all the tasks that the worker is actually capable of performing in addition to the specific task in which the worker is specialized. For instance, if the worker is categorized as a mechanical engineer, the symbol o may be entered in correspondence to the regular operation tasks as well as the mechanical system troubleshooting tasks, which are his specialties, since an engineer is bound to be capable of performing the regular operation tasks under normal circumstances. In addition, an electrical engineer may also be capable of performing mechanical system troubleshooting tasks although mechanical engineering is not his field of expertise. In such a case, the symbol o may be entered in correspondence to the mechanical system troubleshooting tasks as well as the electrical system troubleshooting tasks.

(Trouble Information Database)

The trouble information (error information) database 260 includes an error code information database 262 in which trouble information is stored in memory in correspondence to error codes assigned to specific abnormal states occurring at the semiconductor manufacturing devices 140 and an inspection results information database 264 in which trouble information is stored in correspondence to individual sets of results of semiconductor device inspections.

In the error code information database 262, error code information correlating each error code generated when trouble (an abnormal state) has occurred at a semiconductor manufacturing device 140, the contents of the error code and the category of workers with skills required to correct the abnormal state is stored in memory. For instance, an error code "AABB01" indicates an abnormal state in which the reflected high frequency wave in the processing chamber of a plasma etching device, i.e., a semiconductor manufacturing device 140, which etches workpieces with plasma generated in the processing chamber by applying high-frequency power, has exceeded an upper limit value. This error may originate from the high-frequency generator, the matcher or the like installed in the plasma etching device. Accordingly, the category of workers with skills required to perform the troubleshooting task to correct this abnormal state is "electrical engineer". An error code "CCDD01", on the other hand, indicates an abnormal state attributable to a lowered flow rate of cooling water at a pump, which originates in a pump unit or the like. Accordingly, the category of workers with skills required to perform the troubleshooting task in the event of this abnormal state is "mechanical engineer".

In the inspection results information database 264, inspection results information correlating each set of inspection results indicating an abnormal state in semiconductor devices manufactured with semiconductor manufacturing devices 140 such as plasma etching devices with the category of workers with skills required to perform the appropriate task to correct the abnormal state indicated with the inspection results is stored in memory. Various types of inspections are executed by using inspection devices on wafers manufactured with the semiconductor manufacturing devices 140. Process engineers usually perform troubleshooting tasks in the event of trouble indicated by the results of the inspections. By using the data in the trouble information database 260, the optimal category of workers to undertake a specific troubleshooting task can be determined in correspondence to the nature of the trouble.

(Processing Executed at Worker Management Apparatus)

Next, a specific example of new task assignment processing executed at the worker management apparatus 200 is explained in reference to FIGS. 11 through 14. It is to be noted that the processing explained in reference to the embodiment may be typically realized in the form of a program recorded in a recording medium such as a hard disk device.

In the new task assignment processing executed in the embodiment, a decision is made as to whether or not a worker should continuously perform the current task or be assigned to a newly arising task (decision-making part), and a task execution instruction for the worker is issued (instruction part) based upon the results of the decision made by the decision-making part. Through this processing, an optimal worker to undertake the newly arising task is selected and an instruction is issued to the selected worker by taking into consideration the task contents of the new task, the skills of the worker and the priority levels assigned to the task currently being performed by the worker and the new task.

Figure 11:
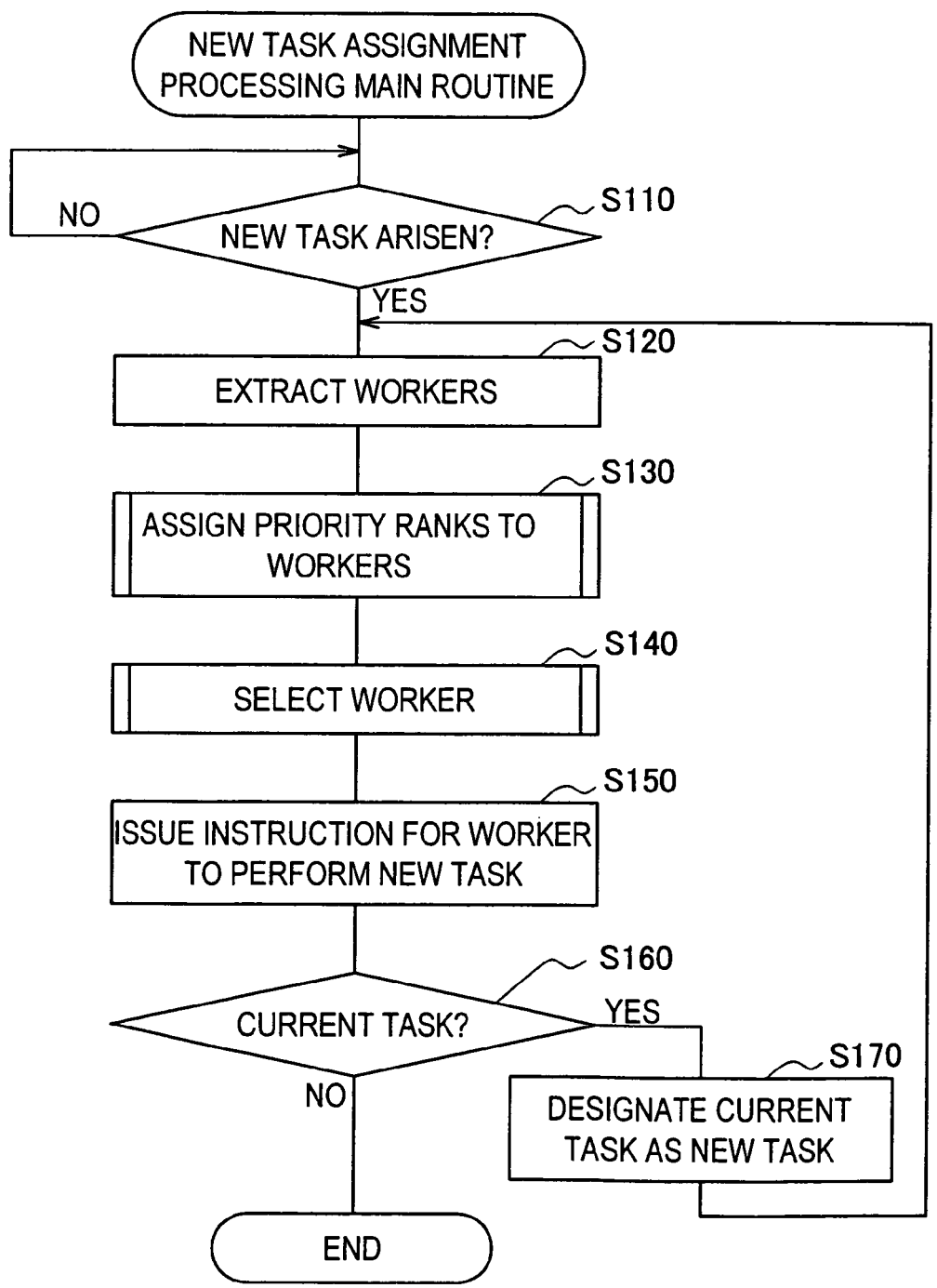
FIG. 11 presents a flowchart of the new task assignment processing main routine executed in the embodiment.

In more specific terms, at the beginning of the new task assignment processing, a decision is made as to whether or not a new task has arisen in step S110, as shown in FIG. 11. The decision as to whether or not a new task has arisen is made based upon, for instance, the warning (alarm) information in addition to error information indicating an abnormal state at a semiconductor manufacturing device 140.

For instance, if trouble has occurred at a given semiconductor manufacturing device 140, the worker management apparatus 200 receives an alarm and error information containing an error code from the semiconductor manufacturing device 140. The specific nature of the new task, i.e., the type of troubleshooting task (an electrical system troubleshooting task or a mechanical troubleshooting task), can be identified based upon the error code contained in the error information by referencing the data in the error code information database 262 at the trouble information database 260.

If the results of an inspection received from an inspection device for a semiconductor manufacturing device 140 indicate an abnormal state, the new task can be determined to be a process system troubleshooting task and further details of the trouble can be ascertained by referencing the data in the inspection results information database 264 at the trouble information database 260.

When a semiconductor manufacturing device 140 finishes processing a lot, it issues a notice of lot completion. This notice makes it possible to identify the new task as a routine task or a regular operation task such as the transportation of the FOUP or the preparation of the next lot. If a cleaning notice or the like is received from a semiconductor manufacturing device 140, the new task can be identified as a routine task.

Next, workers capable of performing the new task are extracted in step S120 (an example of a worker extraction part). The worker extraction may be executed by, for instance, searching for the optimal category of workers to perform the new task at the task skill information database 240 and extracting workers falling in the worker category based upon the data at the worker skill information database 250. In addition, workers in correspondence to whom the symbol o or Δ is entered in the specific field for the new task in the task information 257 at the worker skill information database 250 are also capable of performing the new task even when they do not fall in the optimal worker category for the new task. Accordingly, these workers, too, are extracted.

It is to be noted that the symbol o is always entered in the field for tasks corresponding to a specific field of expertise indicated as a worker category, e.g., the symbol o is always entered in the field in the task information 257 for electrical system troubleshooting tasks in correspondence to the worker category "electrical engineer", at the worker skill information database 250. In addition, the symbol o may be entered for workers whose field of expertise do not match the worker category and the symbol Δ is entered if a worker is still capable of performing a given task with reasonable success even though the task is not in the worker's specific field of expertise. For these reasons, workers in correspondence to whom the symbols o and Δ are entered in the fields in the task information 257 of the worker skill information database 250 may be extracted regardless of their worker categories.

Next, priority ranks are assigned to the workers in step S130 (a priority level assignment part). Based upon the task skills and the worker skills priority ranks are assigned with the top priority given to the worker best suited for the task. For instance, a higher priority rank is assigned to a worker in correspondence to whom the symbol o is entered in the task field at the worker skill information database 250 so as to select a worker specializing in the task with priority. It is to be noted that the processing executed to assign priority ranks to the workers is to be described in detail later.

Next, the worker to perform the task is determined in step S140. The worker is determined by, for instance, sequentially comparing the priority level of the task currently being performed by each worker with the priority level of the new task, starting with the worker with the top priority rank. It is to be noted that the processing executed to select the worker is to be described in detail later.

Next, in step S150, an instruction is issued for the worker determined in step S140 to execute the new task (instruction part). At this time, the instruction for the worker to perform the new task may be transmitted to the portable information terminal carried by the worker.

Then, a decision is made as to whether or not the worker is currently performing another task in step S160. This decision is made based upon the results of the current task detection (step S320 in FIG. 13) executed in the worker selection processing in step S140. The processing in step S160 needs to be executed since if the worker to undertake the new task is currently performing another task, a substitute worker to take over the current task must be selected and an appropriate instruction for the substitute worker must be issued accordingly. If it is decided in step S160 that the worker is currently performing a task, the current task is designated as a new task in step S170, and then the operation returns to the processing in step S120 to select the substitute worker to take over the task. If, on the other hand, it is decided in step S160 that the worker is not currently performing a task, the processing ends.

Figure 12:
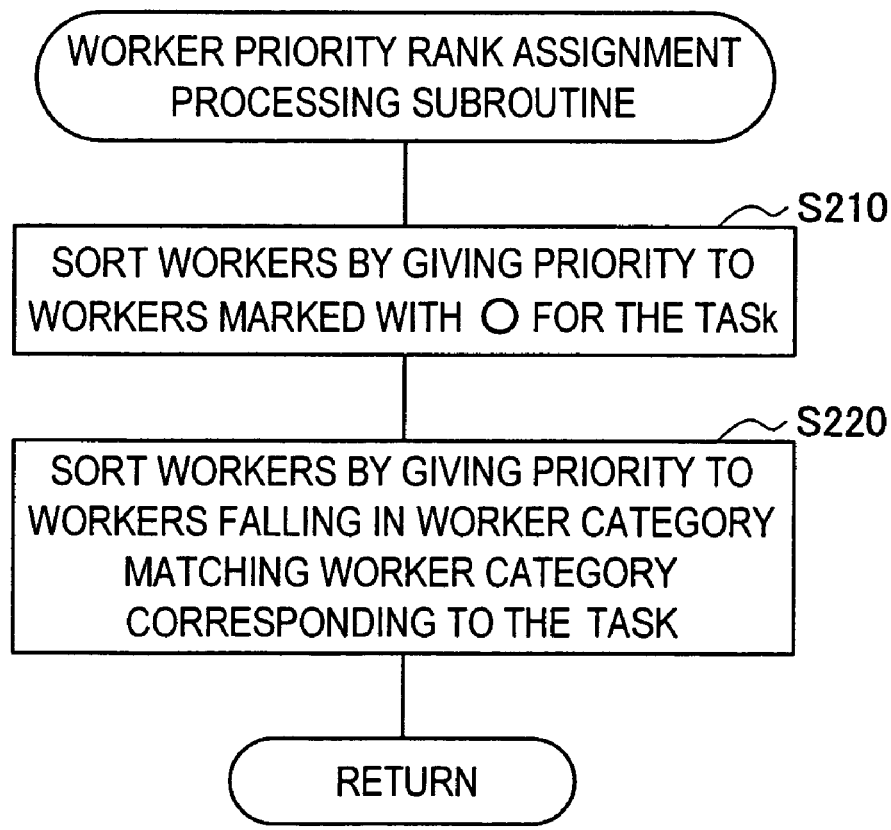
FIG. 12 presents a flowchart of the worker priority rank assignment processing subroutine executed in the embodiment.

An example of the worker priority rank assignment processing (worker priority rank assignment part) executed in step S130 is now explained in detail in reference to the subroutine shown in FIG. 12. In step S210, the workers are sorted so as to give higher priority ranks to those in correspondence to whom the symbol o is entered in their task fields for the new task in the task information 257 at the worker skill information database 250 by using the entries of the symbol o as a first key. Then, in step S220, the workers are further sorted so as to assign the highest priority ranks to workers falling in the task category matching the worker category corresponding to the new task by using the worker category for a new task as a second key.

As a result, the highest priority rank is assigned to a worker with the symbol o entered in his task field at the worker skill information database 250, who also falls in the worker category corresponding to the new task. For instance, if the category of workers with skills best suited to perform the new task is "electrical engineer", higher priority ranks are assigned to electrical engineers even though the extracted workers may include mechanical engineers as well. Thus, the worker to undertake the new task is selected in step S140 by sequentially checking the ranked workers and their availability to perform the new task, starting with the highest ranked worker. Consequently, the worker best suited to perform the new task can be determined more quickly.

Figure 13:
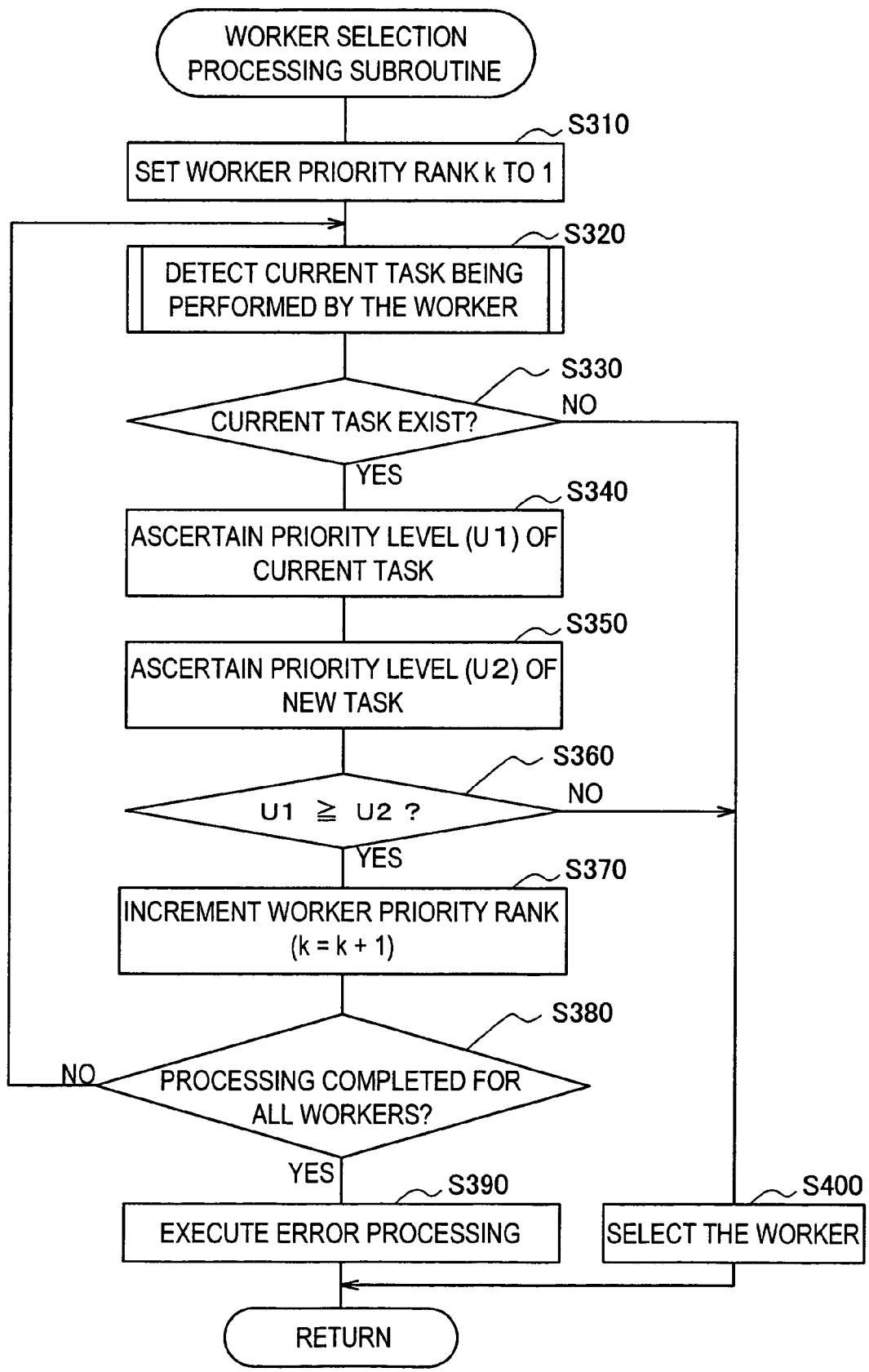
FIG. 13 presents a flowchart of the worker selection processing subroutine executed in the embodiment.

Next, an example of the processing executed in step S140 to select the worker is explained in reference to the subroutine shown in FIG. 13. First, the worker selection processing is executed in step S310 starting with the worker having been given the highest priority rank in step S130 in FIG. 11 by setting the worker priority rank k to 1. Next, in step S320, the task (current task) being performed by the specific worker is detected (an example of the current task identification part). The current task performed by the worker may be detected in correspondence to the area where the worker is currently located, for instance.

Figure 14:
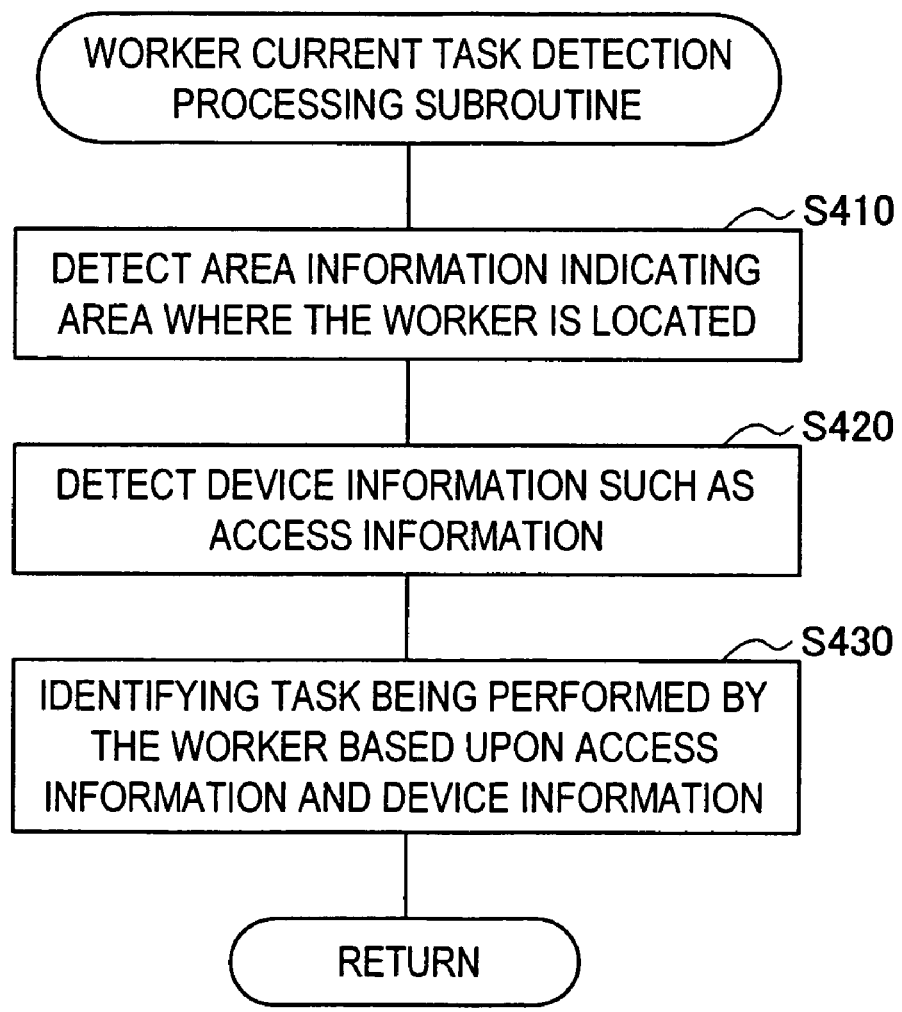
FIG. 14 presents a flowchart of the task detection processing subroutine executed to detect the task being performed by a worker in the embodiment.

The processing for detecting the task currently being performed by the worker may be executed as in the subroutine shown in FIG. 14 (an example of the current task identification part). First, the area information indicating the area where the worker is currently located is detected in step S410. Based upon the area information, the type of task (the task category) currently being performed by the worker can be detected with a certain degree of accuracy. More specifically, the exact area where the worker is currently located, e.g., an equipment room area 112 in the clean room area 110, is detected based upon sensor information provided by a worker detection sensor 130. For instance, the area where the worker detection sensor 130 having detected the frequency designated to the worker is installed may be determined to be the area where the worker is located. If the frequency designated to the worker is detected at the worker detection sensor 130 installed in an equipment room area 112 within the clean room area 110, the worker is judged to be located in the equipment room area 112, whereas if the frequency is detected at a worker detection sensor 130 installed in the non-equipment room area 114, he is judged to be located in the non-equipment room area 114.

Next, in step S420, device information such as access information indicating an access to a semiconductor manufacturing device 140 is detected. Based upon the device information, further details of the current task are detected. Device information containing access information that indicates a specific access, generated at the semiconductor manufacturing device 140, the control unit 116 or 118 or the like, is received at the worker management apparatus 200. By using the access information, the worker is identified in correspondence to the ID and the password and the specific task being performed by the worker is determined. In addition, device information such as warning (alarm) information indicating a warning generated at the semiconductor manufacturing device is received at the worker management apparatus 200. The specific type of task being currently performed may also be determined based upon the warning information, as well.

Next, in step S430, the current task being performed by the worker is identified by checking the task identification information at the task identification information database 220 shown in FIG. 5 in reference to the area information and the device information. For instance, if the area information indicates that the worker is currently located in an equipment room area 112 in the clean room area 110 and the device information contains warning information indicating that there has been a troubleshooting access, the contents of the current task are determined to be a troubleshooting task.

Next, in step S330 in FIG. 13, a decision is made as to whether or not the worker is currently performing a task. The worker is determined to be currently performing a task if a specific task has been identified in step S320, whereas the worker is determined to be currently free if no specific task has been identified. If it is decided in step S330 that the worker is not currently performing a task, the worker is selected to undertake the new task in step S400 (worker identification part).

If, on the other hand, it is decided in step S330 that the worker is currently performing another task, the priority level of the current task is ascertained based upon the task priority level information stored at the task priority level information database 230 in step S340 and the priority level of the new task is also ascertained in step S350. Then, a decision is made in step S360 as to whether or not the priority level (U1) of the current task is higher than the priority level (U2) of the new task or whether or not their priority levels are equal to each other. If it is decided in step S360 that the priority level of the current task is higher than the priority level of the new task or that the priority levels are equal to each other, the operation proceeds to step S370 to increment the priority rank k (k=k+1). Next, a decision is made in step S380 as to whether or not the processing has been executed for all the workers having been assigned with priority ranks. For instance, the number of workers having been extracted and assigned with priority ranks may be set to N and a decision may be made as to whether or not the priority rank k is now equal to N+1. If it is decided in step S380 that the processing has not been executed for all the workers assigned with priority ranks, e.g., if it is decided that the priority rank k is not equal to N+1, the operation returns to the processing in step S320 to process the worker next in the priority ranking.

If it is decided in step S350 that the priority level of the current task being performed by the worker is lower than the priority level of the new task, the worker is selected to undertake the new task in step S400. The worker thus selected is given an instruction to perform the new task in step S150 in FIG. 11.

As described above, the priority levels of the detected current task and the new task are compared and an instruction is issued for the worker to perform the new task if the priority level of the new task is higher. Thus, when a new task has arisen, a decision is made as to whether or not a given worker is to undertake the new task based upon the priority levels of the current task being performed by the worker and the new task, so as to quickly assign a suitable worker to a task with a higher priority level, i.e., a more important task. As a result, optimization of the task assignment is achieved.

In addition, if it is decided in step S380 that the processing has been executed for all the workers assigned with priority ranks, e.g., if it is decided that the priority rank k has become equal to N+1, error processing is executed in step S390. In the abnormal state processing, a message indicating that a suitable worker cannot be found may be displayed at the display unit 204. In this situation, workers capable of performing the task, for instance, may be provided with a notice indicating the unavailability of a suitable worker. Since a suitable worker is more likely to be found for a task with a higher priority level in the processing described above, the task for which a suitable worker cannot be found is likely to have a low priority level. Accordingly, the processing described above may be re-executed after a time lag.

It is to be noted that in the error processing executed in step S390, the category of workers with skills required to perform the task for which a suitable worker has not been found may be searched based upon the task skill information stored at the task skill information database 240 and the task, the worker category, the date/time and the like may be stored in memory in a log file or the like. For instance, if a suitable worker has not been found to perform a mechanical system troubleshooting task, the category of workers with skills required to perform the task is determined to be "mechanical engineer" through the search and accordingly, information indicating the mechanical system troubleshooting task, the mechanical engineer and the like is stored in the log file. Based upon such information, a potential problem in the manpower distribution at the plant, i.e., a lack of mechanical engineers, can be spotted.

As described above, the log file can be used when making a decision as to whether or not the number of workers needs to be adjusted at the plant. For instance, if the error processing is executed frequently, it can be assessed that the number of workers at the plant is insufficient. Furthermore, the specific worker category that needs to be reinforced with more workers can be ascertained. In addition, the number of superfluous workers can be reduced to an extent at which error processing still does not occur. Since this makes it possible to man the plant with optimal numbers of various categories of workers having the skills required at the plant, the efficiency with which each worker performs tasks is improved and optimal efficiency is also achieved with regard to the number of workers at the plant.

If a mechanical system troubleshooting task arises as a new task and an electrical engineer A, a mechanical engineer B, and an operator C are extracted as workers capable of performing the new task, the extracted workers are assigned with priority ranks that set the mechanical engineer B in first place, the electrical engineer A in second place and the operator C in third place and the workers are processed in this order. If B is not performing a task currently, B is selected as the worker to undertake the new task.

In addition, even if B is currently performing a regular operation task, for instance, the priority level of the new task, i.e., the mechanical system troubleshooting task, is higher than the priority level of the regular operation task being performed by B as indicated in the data at the task priority level information database 230 shown in FIG. 6 and, accordingly, B is selected to undertake the new task in this case, as well.

Under these circumstances, the regular operation task currently being performed by B is designated as a new task and subsequently, the processing is executed to select a worker to undertake the new task. The priority ranks assigned to the workers through this processing place the operator C in first place, the electrical engineer A in second place and the mechanical engineer B in third place and the workers are processed in this order. If the operator C is not currently performing any task, C is selected to undertake the new task.

In addition, even if C is currently performing a routine task, for instance, the priority level of the new task, i.e., the regular operation task, is higher than the priority level of the routine task being performed by C as indicated in the data at the task priority level information database 230 shown in FIG. 6 and, accordingly, C is selected to undertake the new task in this case, as well.

However, if C is currently performing a regular operation task in another area, the priority levels of the current task and the new task are equal to each other as indicated with the data at the task priority level information database 230 in FIG. 6 and accordingly, C is allowed to continue to perform the current task. In this situation, if the electrical engineer A is currently free, A is selected to undertake the new task.

Second Embodiment

Next, the worker management system achieved in the second embodiment by adopting the present invention in a semiconductor manufacturing plant is explained in reference to drawings. It is to be noted that since the structural features shown in FIGS. 1 through 10 also apply to the second embodiment, a repeated explanation thereof is omitted. In addition, the same reference numerals are assigned to components similar to those in the first embodiment to preclude the necessity for a detailed explanation thereof.

Figure 15:
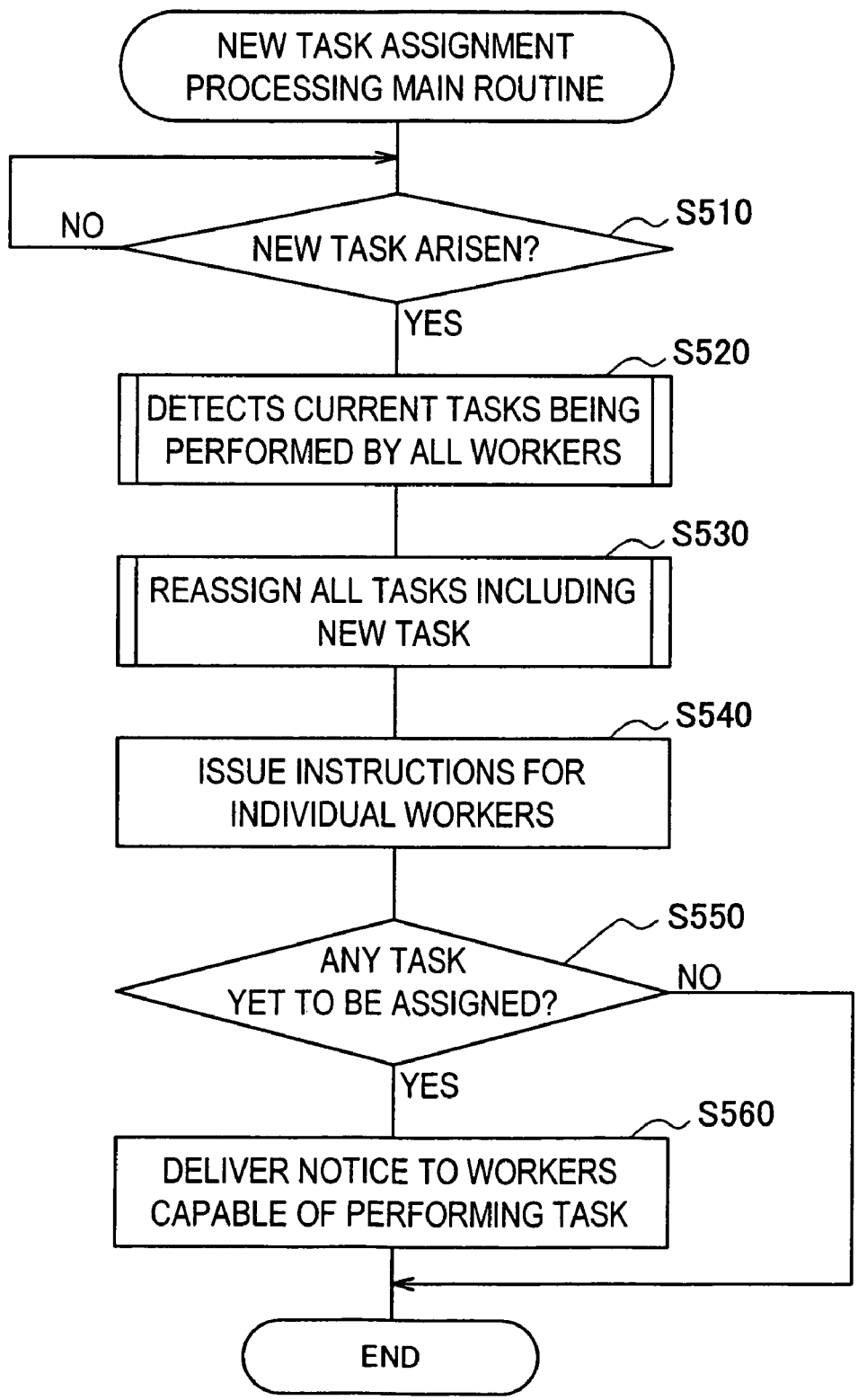
FIG. 15 presents a flowchart on the new task assignment processing main routine executed in a second embodiment of the present invention.
Figure 16:
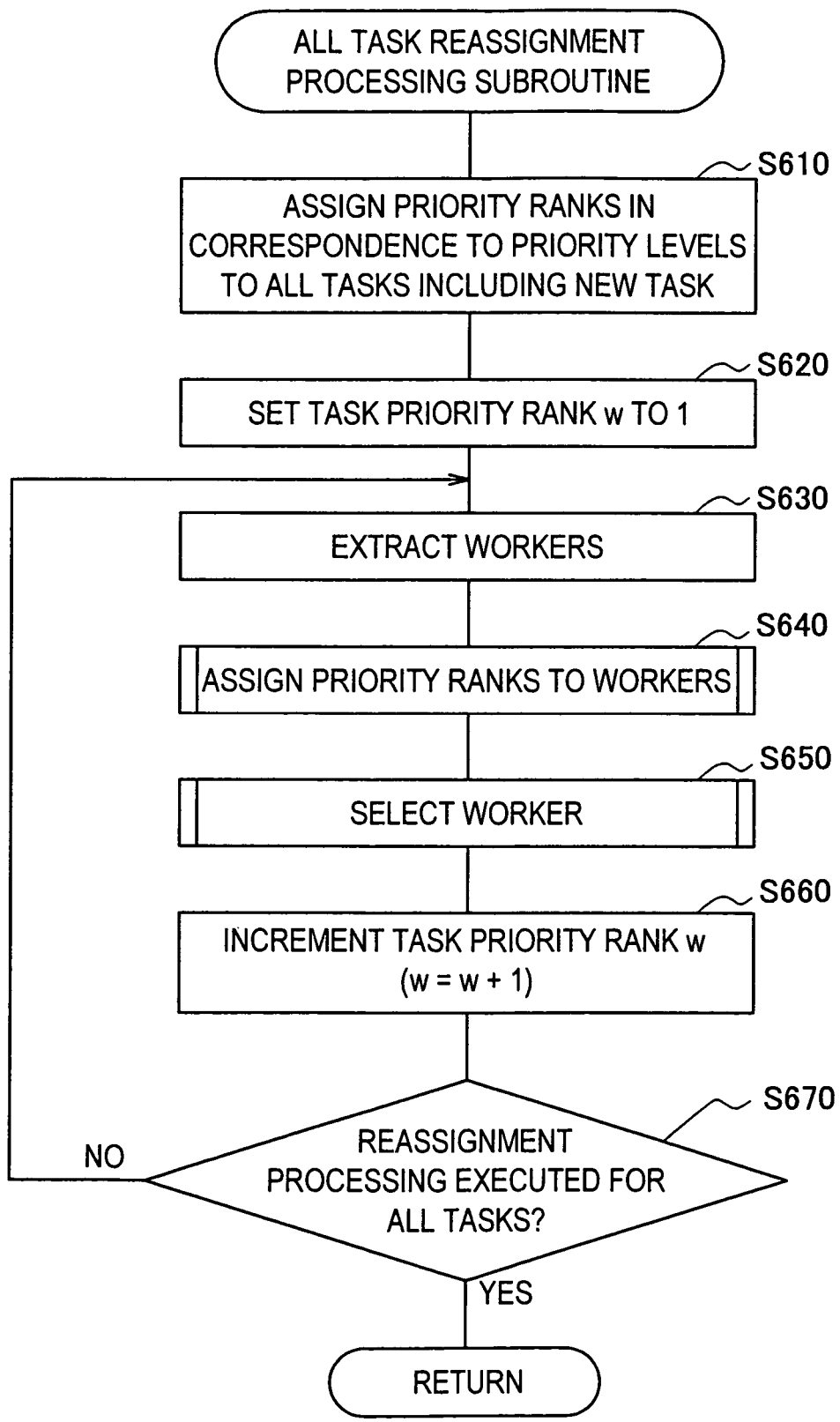
FIG. 16 presents a flowchart of the all task reassignment processing subroutine executed in the embodiment.

Another specific example of new task assignment processing that may be executed at the worker management apparatus 200 in the second embodiment is now explained in reference to FIGS. 15 and 16. It is to be noted that the processing executed in the embodiment may be typically achieved in the form of a program recorded in a recording medium such as a hard disk device.

The new task assignment processing executed in the second embodiment differs from the processing shown in FIG. 11 which is executed in the first embodiment in that when a new task arises, all the tasks including the new task and the current tasks being performed by all the workers are reassigned so as to assign optimal workers to tasks that need them the most by taking into consideration the priority levels of the individual tasks, the task skills and the worker skills.

More specifically, a decision is made as to whether or not a new task has arisen in step as 510, as shown in FIG. 15. This decision may be made based upon error information, warning information and the like generated when trouble has occurred at, for instance, a semiconductor manufacturing device 140, as in step S310 described earlier. Next, the tasks currently performed by all the workers are detected in step S520. The current tasks being performed by all the workers may be detected by, for instance, repeatedly executing the subroutine shown in FIG. 14 for the individual workers.

Next, in step S530, all the tasks including the new task and the current tasks are reassigned (task reassignment part). As described above, if a new task arises, the tasks currently being performed by all the workers are detected and all the tasks including the current tasks and the new task are reassigned so as to assign better suited workers to work on all the tasks including the new task. As a result, higher levels of efficiency are achieved in both the task assignment and the task execution. It is to be noted that the processing executed to reassign the tasks is to be described in detail later.

Next, in step S540, instructions for the individual workers to perform the tasks assigned to them are issued. The instruction for each worker to perform a specific task may be transmitted to his portable information terminal.

Next, a decision is made as to whether or not there is any task that has not been assigned yet in step S550. If it is decided in step S550 that there is a task yet to be assigned, a notice is issued to a worker capable of performing the task as an instruction to perform the task in step S560 before the processing ends. The processing also ends promptly upon deciding in step S550 that there is no further task to be assigned.

Now, an example of the task reassignment processing (task reassignment part) executed in step S530 is explained in reference to the subroutine shown in FIG. 16. First, all the tasks including the new task and the current task are sorted in the order of priority based upon the task priority level information stored at the task priority level information database 230. W represents the specific priority level of a given task. Next, in step S620, the optimal worker to perform the task having the highest priority level is selected through the processing described below by setting the priority level W to 1.

Next, workers capable of performing the task are extracted in step S630. Then, in step S640, priority ranks are assigned to the extracted workers. The priority rank assignment processing may be executed as in the subroutine shown in FIG. 12, for instance. Then, the worker to perform the task is selected in step S650. The worker selection processing may be executed as in the subroutine shown in FIG. 13, for instance.

Next, the task priority level W is incremented (W=W+1) in step S660, and then a decision is made in step S670 as to whether or not the processing has been executed for all the tasks. Through this method, workers are assigned to all the tasks, in principle. However, there may sometimes be a task for which a suitable worker cannot be found. In such a case, a notice indicating that there is a task yet to be assigned is delivered workers capable of performing the task through the processing executed in steps S550 and S560 in FIG. 15.

In the processing described above, when a new task arises, the tasks currently performed by all the workers are detected and all the tasks including the new task are ranked in order of priority based upon the data stored at the task priority level information database 230. Then, the workers to undertake specific tasks are selected starting with the task with the highest priority level. For instance, if the tasks assigned with priority levels are a mechanical system troubleshooting task and a regular operation task, the worker to perform the mechanical system troubleshooting task is first selected.

If the electrical engineer A, the mechanical engineer B, and the operator C are extracted as workers capable of performing the first task, i.e., the mechanical system troubleshooting task, the extracted workers are assigned with priority ranks that set the mechanical engineer B in first place, the electrical engineer A in second place and the operator C in third place and the workers are processed in this order. If B is not performing a task currently, B is selected as the worker to undertake the new task.

Next, the worker to undertake the regular operation task is selected. The priority ranks assigned to the workers through the processing place the operator C in first place, the electrical engineer A in second place and the mechanical engineer B in third place and the workers are processed in this order. If the operator C is currently free, C is selected to undertake the new task.

As described above, when a new task has arisen, all the tasks including the new task are reassigned by selecting appropriate workers to perform the individual tasks starting with the task with the highest priority level. As a result, an appropriate worker can be selected more speedily for a more important task. In addition, when reassigning all the tasks including the new task, the priority level of the current task detected for a worker is compared with the priority level of the new task and an instruction can be issued for the worker to perform the new task if the priority level of the new task is higher. As a result, a more suitable worker can be selected to perform a more important task with a higher priority level to achieve optimization in the task assignment and higher efficiency in task execution.

Third Embodiment

Next, the worker management system achieved in the third embodiment by adopting the present invention in a semiconductor manufacturing plant is explained in reference to drawings. It is to be noted that since the structural features shown in FIGS. 1 through 10 also apply to the third embodiment, a repeated explanation thereof is omitted. In addition, the same reference numerals are assigned to components similar to those in the first embodiment to preclude the necessity for a detailed explanation thereof. It is to be noted that the processing executed in the embodiment may be typically achieved in the form of a program recorded in a recording medium such as a hard disk device.

Figure 17:
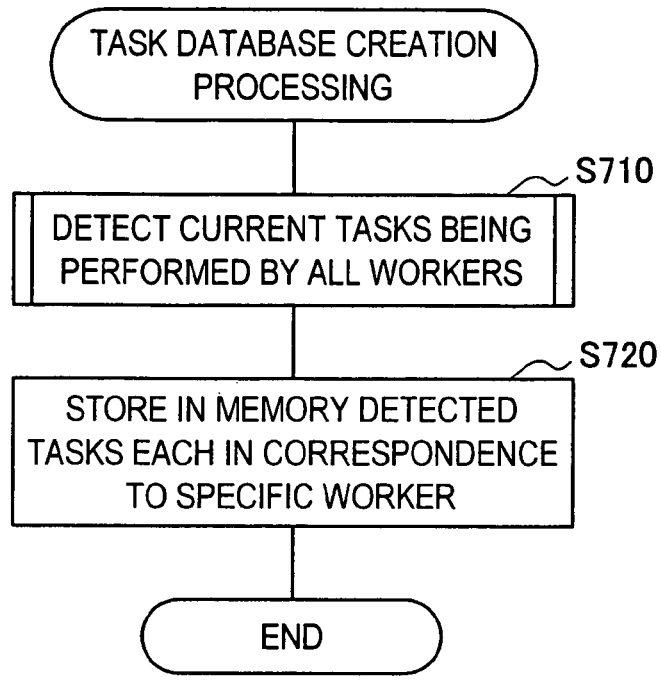
FIG. 17 presents a flowchart of the task database creation processing executed in a third embodiment of the present invention.

Processing executed to create a task database is now explained in reference to FIG. 17 as an example of the task information storage part included in the worker management apparatus 200 achieved in the third embodiment. The task database is used when preparing a daily task report for each worker, as detailed later. Accordingly, tasks performed by each worker are stored into memory over predetermined time intervals at the task database. For this reason, the task database creation processing is executed over the predetermined time interval over which entries are made in the daily task report. For instance, if the daily task report is to include entries made every hour, the task database creation processing needs to be executed every hour, whereas if the daily task report is to include entries made every 30 minutes, the task database creation processing, too, needs to be executed every 30 minutes.

At the beginning of the task database creation processing, the tasks currently performed by all the workers (current tasks) are detected in step S710. The current tasks being performed by the individual workers may be detected by, for instance, repeatedly executing the subroutine in FIG. 14 for all the workers so as to process one worker at a time. In step S720, the current tasks detected in correspondence to the individual workers are stored into memory. By storing into memory the current tasks detected in correspondence to the individual workers over the predetermined time intervals as described above, a task database is created for each worker.

These task databases may be created as part of the various databases 210 shown in FIG. 3.

Figure 18:
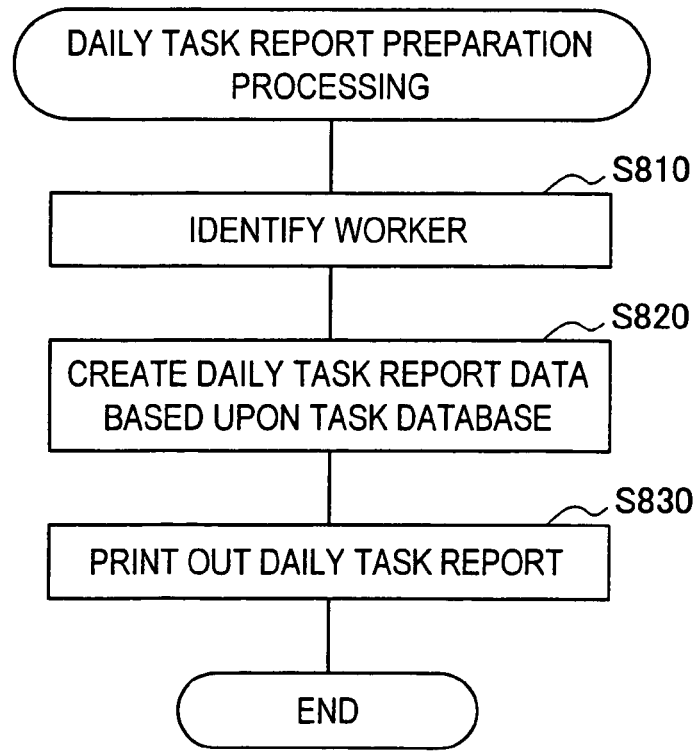
FIG. 18 presents a flowchart of the daily task report preparation processing executed in the embodiment.

Next, an explanation is given in reference to FIG. 18 on daily task report preparation processing executed at the worker management apparatus 200, which embodies an example of a task report preparation part. Through the daily task report preparation processing, a daily task report is automatically prepared for each worker.

First, a specific worker is identified in step S810. In other words, the worker for whom a daily report is to be prepared is identified. In this situation, a specific worker's name may be entered in an operating screen to enable the preparation of a daily task report for the worker, or all the workers may be automatically identified in sequence so as to prepare daily task reports for all of them.

Next, in step S820, daily task report data for the specific worker are prepared based upon the task database created through the processing shown in FIG. 17. The daily task report data are prepared by extracting the tasks performed by the worker on the particular day.

Then, in step S830, the daily task report is printed out. Once the daily task report is printed out on a printer connected to the worker management apparatus 200 the processing ends. An example of a daily task report that may be prepared through the processing described above is shown in FIG. 19. This daily task report is prepared by detecting the tasks performed by the worker through the task database creation processing executed as shown in FIG. 17 over one-hour intervals.

It is to be noted that such daily task report may be used for billing purposes when varying fees are charged for different tasks performed by a worker dispatched from another company to work at a plant, for instance. If specific task unit prices are stored in memory at the worker skill information database 250, the task unit prices of the individual tasks may be searched and printed out so as to bill the client for the total of the fees corresponding to the task contents.

In addition, by extracting data from the task databases on a monthly basis, monthly task reports, too, can be prepared and printed out. As explained above, by adopting the embodiment, task reports such as daily task reports and monthly task reports can be prepared with ease. Since the tasks performed by each worker are detected and a task database to be used in the preparation of a task report for the worker is created, the worker does not need to enter information indicating each task he undertakes through the portable information terminal or the like, and as a result, the work efficiency improves. Furthermore, an accurate task report can be prepared at all times without having to rely on a subjective account provided by the worker himself.

The present invention described above facilitates identification of tasks currently performed by workers and thus, makes it possible to select and assign the optimal worker to a newly arising task by taking into consideration the priority levels of the current tasks and the new task. Since the individual workers can be assigned to tasks in which they are most needed, the work efficiency of each worker, too, can be improved.

It is to be noted that while the receivers 134 that constitute the worker detection sensors 130 installed in the various areas 110 and 120, as shown in FIG. 1, are connected with the worker management apparatus 200 through communication cables or the like in the embodiments described above, the present invention is not limited to this example and they may be connected through a network instead of communication cables or the like. In addition, the receiver 134 shown in FIG. 2 may be a transceiver having transmission/reception functions, and the transmitter 138 in FIG. 2 may be a portable information terminal having transmission/reception functions. Various types of sensors including an odor sensor may be installed at the portable information terminal so as to detect an abnormal state based upon detection values provided by the sensors.

More specifically, a network-connectable transceiver 320 with a network connection capability such as a router capability may be installed in each equipment room area 112. The network-connectable transceiver 320 is connected to the worker management apparatus 200 via a network 300. The worker management apparatus 200 is connected with the network 300 via a network connection device 340 with a network connection capability such as a router capability.

The transmitter 138 carried by each worker, such as that shown in FIG. 2, may be constituted with a portable information terminal 360 with a transmission/reception function. It is to be noted that such a portable information terminal 360 may be a PDA (personal digital assistant), a notebook type computer or a computer (e.g., a tablet PC) that allows data input via a pen.

The portable information terminal 360 includes a control unit 364, a modulation/demodulation unit 366, a communication interface 368 and the like as well as various sensors 362 that detect sound, odor and the like for purposes of abnormal state detection, including an odor sensor, a high-frequency sensor and a low-frequency sensor. The modulation/demodulation unit 366 modulates data to be transmitted via the communication interface 368 to, for instance, a wireless signal and demodulates data having been received via the communication interface 368.

The network 300 may be a public network such as the Internet or it may be a closed network such as a WAN (wide area network), a LAN (local area network) or an IP—VPN (Internet protocol—virtual private network). In addition, the communication medium may be an optical fiber cable used in conjunction with an FDDI (fiber distributed data interface), a coaxial cable or a twisted-pair cable used in an ethernet network or a wireless medium in compliance with IEEE 802.11b. It may be either a wired medium or a wireless medium, and it may even be a satellite network.

The network-connectable transceiver 320 mentioned above may have, for instance, a wireless router function so as to enable data exchange between the network-connectable transceiver 320 and the portable information terminal 360 via a wireless LAN by constituting the communication interface 368 at the portable information terminal 360 with a wireless LAN card or the like.

The various sensors 362 installed at the portable information terminal 360 may be sensors capable of detecting sound wave frequencies, cycles and the like that cannot be detected by the human ear. An odor sensor included in the various sensors 362 may detect an odor when an odoriferous compound becomes adhered to the sensor surface. An odor sensor constituted with, for instance, a gas detecting sensor may detect harmful gases such as halogen gas containing CO, Cl or the like. In addition, the friction factor and the viscosity of the oil at the evacuation pump through which the processing chamber in the semiconductor manufacturing device is evacuated may be detected by checking the oil vapor.

More specifically, the various sensors 362 may include an oscilloscope, a spectrum analyzer, a Fast Fourier Transform (FFT) unit, a vibration analyzer, an oscillating quartz sensor, a semiconductor sensor and a photosensor. The portable information terminal 360 may include a selector switch (not shown) used to select a specific sensor among the various sensors 362 so that the worker is able to select a desired sensor with the selector switch.

It is to be noted that data (external environment information) entered by the worker through an input part provided at the portable information terminal 360 may be used as sensor data. Various types of data obtained through a measuring operation performed by the worker with a measuring instrument, displayed at an operation panel and the like may be entered as the external environment information constituting sensor data. The input part may be an input part of the known art at which data are input through key entry, through a touch panel or the like.

The control unit 364 at the portable information terminal 360 is capable of making a decision as to whether or not an abnormal state has occurred at a semiconductor manufacturing device or the like based upon detection values provided by the various sensors 362. For instance, upon detecting noise or odor, the control unit may decide that an abnormal state has occurred or it may store in memory abnormal state threshold values in a storage unit (not shown) and may decide that an abnormal state has occurred if noise or odor occurs at an extent exceeding the threshold value. Based upon the detection values provided by such sensors, an abnormal state can be detected before it culminates in one of the errors shown in FIG. 9, for instance.

If it is decided that an abnormal state has occurred, the portable information terminal 360 transmits the data provided by the sensor having detected the abnormal state among the various sensors 362 to the worker management apparatus 200 via the network 300. Based upon the sensor data received from the portable information terminal 360, the worker management apparatus 200 makes a decision as to whether or not a new task has arisen as in step S110 in FIG. 11 or in step S510 in FIG. 15.

More specifically, the various databases 210 may include, for instance, an error precursor information database (not shown) in which any precursors to errors such as those shown in FIG. 9 are stored in memory as precursor information, and a new task may be determined to have arisen by identifying the task in an integrated manner in reference to the error precursor information stored in memory in the error precursor information database. In this situation, the worker management apparatus 200 may access the semiconductor manufacturing device 140 having been determined to be in an abnormal state to engage the warning part of the semiconductor manufacturing device to issue a warning such as an alarm and the lamp part of the semiconductor manufacturing device to turn on the lamp and the like.

A specific example of data that may be stored in the error precursor information database is described below. In the error precursor information database, a leak rate increase (precursor 1) and a base pressure increase (precursor 2) are stored in memory as vacuum-side error precursor information, and abnormal noise (precursor 3) and increased vibration (precursor 4) are stored in memory as atmosphere-side error precursor information. The leak rate increase (precursor 1) may be detected when, for instance, the atmosphere is allowed to flow into the processing chamber due to degradation of the O-ring disposed at the processing chamber of the semiconductor manufacturing device. The base pressure increase (precursor 2) may occur when, for instance, the level of the evacuating capability becomes lowered due to fatigue of the vacuum pump used to evacuate the processing chamber or a deposit of foreign matter at the vacuum pump. The abnormal noise (precursor 3) may occur when a desirable level of functional balance is not achieved in the semiconductor manufacturing device due to degradation of the bearings in addition to degradation of the vacuum pump. The increased vibration (precursor 4) may occur when a desired level of functional balance is not achieved in the semiconductor manufacturing device due to degradation of the bearings in addition to a significant deposit of foreign matter, degradation of the vacuum pump and the like. The precursors 1 and 2 may be detected based upon, for instance, the external environment information entered at the portable information terminal 360 by the worker. The precursors 3 and 4 may be detected based upon the sensor data provided by the various sensors 362.

With such precursor information stored in memory at the error precursor information database, if the precursor 1 alone is detected based upon the external environment information entered by the worker at the portable information terminal 360 and the precursors 3 and 4 are not detected, the vacuum pump is likely to be operating normally but a chamber leak (a leak inside the processing chamber) is likely to have occurred. Accordingly, it is decided that a new task, i.e., a maintenance task, needs to be performed in response to the occurrence of the chamber leak. Upon making this decision, an instruction is issued for the worker selected to perform the new task through the processing in FIG. 11 or 15 to undertake the new task. More specifically, the worker management apparatus 200 may transmit the instruction for the worker to his portable information terminal 360 via the network 300.

Figure 20:
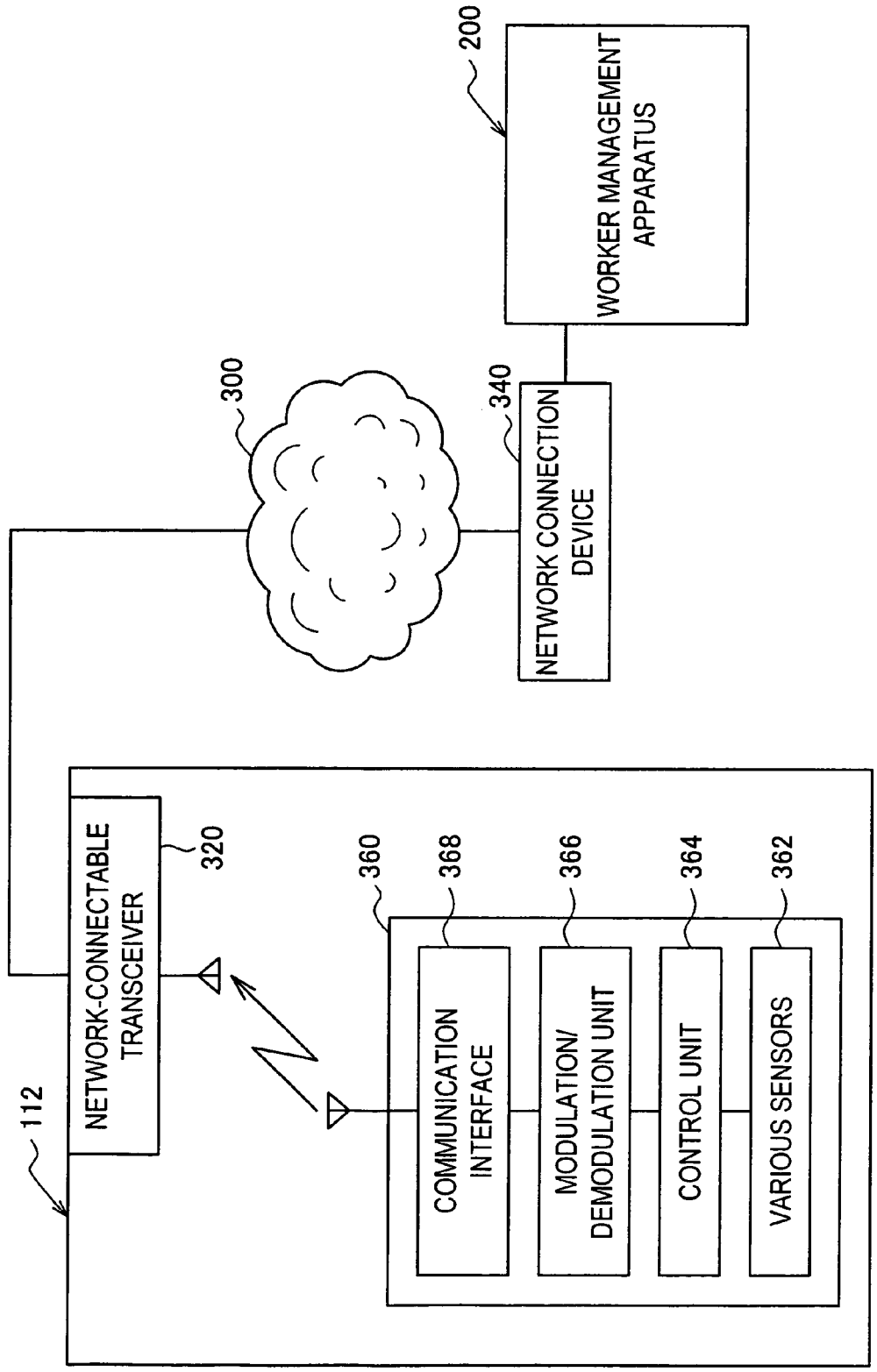
FIG. 20 is a block diagram of a variation of the worker management system.

It is to be noted that the sensor data detected or entered at the portable information terminal 360 shown in FIG. 20 may be transmitted to the worker management apparatus 300 each time they are detected or entered, or they may be transmitted to the worker management apparatus 200 together with the worker identification information when detecting the area information in step S410 in FIG. 14. Then, a decision may be made as to whether or not a new task has arisen by making a decision at the worker management apparatus 200 as to whether or not an abnormal state has occurred.

In addition, the transmission/reception functions of the network-connectable transceiver 320 and the portable information terminal 360 are not limited to wireless transmission/reception functions, and they may instead be infrared transmission/reception functions or the like. Furthermore, the portable information terminal 360 may include a GPS (global positioning system) unit to be used to detect the worker position.

While the invention has been particularly shown and described with respect to preferred embodiments thereof by referring to the attached drawings, the present invention is not limited to these examples and it will be understood by those skilled in the art that various changes in form and detail may be made therein without departing from the spirit, scope and teaching of the invention.

For instance, the present invention may be adopted in a worker management system utilized to manage workers employed by a company that owns a semiconductor manufacturing plant, or it may be adopted in a worker management system for managing a workforce that includes workers dispatched from a company other than the owner of the semiconductor manufacturing plant to work at the semiconductor manufacturing plant. In particular, the present invention can be effectively adopted in a worker management system for managing workers dispatched from the manufacturer or the vendor of the semiconductor manufacturing devices to perform maintenance on the semiconductor devices, semiconductor manufacturing tasks and the like at a plant owned by a customer who is the purchaser or user of the semiconductor manufacturing devices. In such an application, the work efficiency of each dispatched worker can be maximized, the workers can be classified in a manner that suits the specific characteristics of the plant, and the optimal number of workers to work at the plant can be determined.

As a result, the manufacturer or the vendor of the semiconductor manufacturing devices is able to minimize the number of workers dispatched to the plant owned by the customer who purchases or uses the semiconductor manufacturing devices. At the same time, the customer who purchases or uses the semiconductor manufacturing devices is able to minimize the manpower cost related to workers dispatched from the manufacturer or the vendor of the semiconductor manufacturing devices.

As described above, the present invention may be adopted in a worker management system, a worker management apparatus and a worker management method.

What is claimed is:

1. A worker management apparatus used to manage workers performing tasks at a work site divided into a plurality of work areas each in correspondence to specific task contents, comprising:
    a task identification information storage part for storing in memory task identification information correlating each of the work areas in the work site with task contents of tasks performed in the work area;
    a worker position identification part for identifying a specific work area where a worker is currently present based upon outputs from a worker detection part installed in each of the work areas, each worker detection part including a receiver that receives electromagnetic waves transmitted from transmitters carried by each of the workers, each of the transmitters being set so as to transmit an electromagnetic wave carrying identification information that can be used to identify a specific worker, the worker position identification part obtaining worker identification information from the worker detection part, detecting the worker detection part that has received the identification information corresponding to a worker undergoing work area detection and identifying the work area in which the worker detection part is installed as the work area where the worker is present;
    a current task identification part for identifying the task currently performed by the worker in correspondence to the work area where the worker is located which is identified by the worker position identification part, based upon the task identification information stored at the task identification information storage part;
    a task priority level information storage part for storing in memory task priority information;
    a new task detection part for detecting that a new task has arisen based upon an electromagnetic wave transmitted from a portable information terminal carried by the worker, the portable information terminal having thereon a sensor for predetermined state detection, the electromagnetic wave indicating a decision value provided by the sensor;
    a task reassignment part for engaging the current task identification part to identify current tasks being performed by all the workers when the new task is detected by the new task detection part, assigning task priority levels to all tasks including the current tasks and the new task based upon the task priority level information stored at the task priority level information storage part, and reassigning all the tasks for all the workers starting with a task with a higher priority level, the task reassignment part assigning a task with a higher task priority level as a new task;
    an instruction part for issuing instructions for the portable information terminals carried by all the workers to perform tasks reassigned by the task reassignment part;
    a worker skill information storage part for storing in memory worker skill information correlating each of the workers with tasks that each of the workers is capable of performing;
    a worker extraction part for extracting workers capable of performing the new task based upon the worker skill information stored at the worker skill information storage part; and
    a worker identification part for executing worker identification processing by engaging the current task identification part to identify current tasks being performed by the workers extracted by the worker extraction part, ascertaining and comparing priority levels of the current tasks and a priority level of the new task based upon the task priority level information stored at the task priority level information storage part and identifying a worker performing a current task with a priority level lower than the priority level of the new task as a worker to take on the new task.

2. A worker management apparatus according to claim 1, wherein:
    the transmitters are each set so as to transmit an electromagnetic wave with a frequency unique to a specific worker; and
    the worker position identification part detects a worker detection part that has received an electromagnetic wave with a frequency assigned to a worker undergoing a work area detection and identifies the work area in which the worker detection part is installed as the work area where the worker is present.

3. A worker management apparatus according to claim 1, further comprising:
    a task information acquisition part for obtaining task information of the workers from work devices installed in the work areas, wherein:
    the current task identification part obtains the task information originating at a work device at which the worker is performing a task via the task information acquisition part in addition to work area information indicating the work area identified as the work area in which the worker is currently present and identifies the current task being performed by the worker based upon the area information and the task information.

4. A worker management method for managing workers performing tasks at a work site divided into a plurality of work areas each in correspondence to specific task contents, comprising:
    a worker position identification act in which a specific work area where a worker is currently present is identified based upon outputs from worker detection part installed in each of the work areas, each worker detection part including a receiver that receives electromagnetic waves transmitted from transmitters carried by each of the workers, each of the transmitters being set so as to transmit an electromagnetic wave carrying identification information that can be used to identify a specific worker, the worker position identification act obtaining identification information from the worker detection part, detecting the worker detection part that has received the identification information corresponding to a worker undergoing work area detection and identifying the work area in which the worker detection part is installed as the work area where the worker is present:

a current task identification act in which the task currently performed by the worker present in the work area identified through the worker position identification act is identified based upon task identification information available at a task identification information storage part for storing in memory the task identification information correlating each of the work areas at the work site with task contents of the tasks performed in the work areas;

a new task detection act in which a new task having arisen is detected based upon an electromagnetic wave transmitted from a portable information terminal carried by each worker, the portable information terminal having thereon a sensor for predetermined state detection, the electromagnetic wave indicating a decision value provided by the sensor;

a task reassignment act in which current tasks being performed by all the workers is identified through the current task identification step when a new task is detected in the new task detection step, task priority levels are assigned to all the tasks including the current tasks and the new task based upon task priority level information available at a task priority level information storage part for storing in memory the task priority information, and all the tasks are reassigned for all the workers starting with a task with a higher priority level, the task reassignment act assigning a task with a higher task priority level as a new task; and an instruction step in which instructions are issued to the portable information terminal carried by all the workers to perform tasks reassigned through the task reassignment step;

a worker extraction act which extracts workers capable of performing the new task based upon worker skill information stored at a worker skill information storage part, the worker skill information storage part storing in memory worker skill information correlating each of the workers with tasks that each of the workers is capable of performing; and a worker identification act which identifies works by engaging the current task identification act to identify current tasks being performed by the workers extracted by the worker extraction act, ascertains and compares priority levels of the current tasks and a priority level of the new task based upon the task priority level information stored at the task priority level information storage part and identifies a worker performing a current task with a priority level lower than the priority level of the new task as a worker to take on the new task.

* * * * *